(12) United States Patent
Kamihara et al.

(10) Patent No.: US 8,283,083 B2
(45) Date of Patent: Oct. 9, 2012

(54) FUEL CELL SYSTEM

(75) Inventors: Tetsuya Kamihara, Yokohama (JP); Takashi Iimori, Tokyo (JP); Hitoshi Igarashi, Yokosuka (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 1213 days.

(21) Appl. No.: 11/792,495

(22) PCT Filed: Dec. 9, 2005

(86) PCT No.: PCT/JP2005/023098
§ 371 (c)(1),
(2), (4) Date: Jun. 7, 2007

(87) PCT Pub. No.: WO2006/064893
PCT Pub. Date: Jun. 22, 2006

(65) Prior Publication Data
US 2008/0187790 A1 Aug. 7, 2008

(30) Foreign Application Priority Data

Dec. 16, 2004 (JP) .................................. 2004-364337
Jul. 22, 2005 (JP) .................................. 2005-213230

(51) Int. Cl.
*H01M 8/04* (2006.01)
(52) U.S. Cl. ......... 429/431; 429/428; 429/429; 429/430
(58) Field of Classification Search .................. 429/429, 429/431
See application file for complete search history.

(56) References Cited

U.S. PATENT DOCUMENTS

| | | | | |
|---|---|---|---|---|
| 5,637,414 A | * | 6/1997 | Inoue et al. .................. | 429/431 |
| 6,645,654 B2 | | 11/2003 | Yagi | |
| 2002/0009623 A1 | * | 1/2002 | St-Pierre et al. ................. | 429/13 |
| 2003/0000758 A1 | * | 1/2003 | Bruck et al. .................. | 180/279 |
| 2005/0074641 A1 | * | 4/2005 | Inai et al. ......................... | 429/13 |

FOREIGN PATENT DOCUMENTS

| | | |
|---|---|---|
| JP | 2001-345114 A | 12/2001 |
| JP | 2003-115317 A | 4/2003 |
| JP | 2003-151592 A | 5/2003 |
| JP | 2003-272683 A | 9/2003 |
| JP | 2004-087244 A | 3/2004 |
| JP | 2004-173450 * | 6/2004 |
| JP | 2004-173450 A | 6/2004 |
| JP | 2004-179034 A | 6/2004 |
| WO | WO 03/061046 A2 | 7/2003 |
| WO | WO 2005/078845 A2 | 8/2005 |

* cited by examiner

*Primary Examiner* — Barbara Gilliam
*Assistant Examiner* — Steven Scully
(74) *Attorney, Agent, or Firm* — Foley & Lardner LLP

(57) ABSTRACT

A fuel cell system including: a fuel cell supplied with a fuel gas to a fuel electrode thereof and air to an air electrode thereof; a fuel gas supplying device which supplies the fuel gas to the fuel electrode; an air supplying device which supplies air to the air electrode; a fuel gas pressure regulator which regulates fuel gas pressure at the fuel electrode; a purge valve which discharges exhaust fuel gas from the fuel electrode to the outside; and a controller. The controller continues power generation of the fuel cell, controlling the fuel gas pressure regulator to lower the fuel gas pressure at the fuel electrode, having the air supplying device continuing supplying air to the air electrode with the purge valve closed; and after the fuel gas pressure at the fuel electrode becomes equal to or lower than the atmospheric pressure, stops power generation of the fuel cell.

25 Claims, 9 Drawing Sheets

FUEL CELL SYSTEM

TECHNICAL FIELD

The present invention relates to a fuel cell system including a fuel cell to which fuel gas and oxidant gas are supplied to generate electric power, and treating gas discharged from the fuel cell when stopping the power generation.

BACKGROUND ART

In a fuel cell system including a polymer electrolyte fuel cell stack to which hydrogen gas (fuel gas) and air (oxidant gas) are supplied to generate electric power, stable power generation is generally realized by supplying to the fuel cell stack an amount of hydrogen gas more than that of hydrogen gas consumed therein. Additionally, the fuel cell system includes a hydrogen gas circulation system whereby, by allowing excess hydrogen gas discharged from a fuel cell stack to be circulated into a hydrogen-gas inlet of the fuel cell stack, the excess hydrogen gas is reused and efficiency of hydrogen gas use is thus enhanced.

In the hydrogen gas circulation system, due to such a cause as nitrogen permeation in the fuel cell stack from an air electrode to a hydrogen electrode, impurities other than hydrogen are gradually accumulated. To cope with this event, in a fuel cell system indicated in Japanese Patent Application Laid-open publication No. 2003-151592, hydrogen gas is circulated by use of a circulation pump while a purge valve disposed in the circulation system is opened at regular intervals. Thereby, a reduction in power generation efficiency is prevented by discharging to the outside of the system the impurities accumulated in the system. It is required to reduce hydrogen concentration of the thus discharged gas before the gas is released to the atmosphere. For that purpose, dilution of the discharged gas is carried out by using air discharged from the fuel cell stack.

With regard to a technology of stopping power generation of a fuel cell stack, Japanese Patent Application Laid-open Publication No. 2003-115317 discloses an operation (hereinafter, referred to as an air-electrode oxygen consumption operation) which allows oxygen in an air electrode to be consumed by, before power generation of a fuel cell stack is stopped, stopping air supply while continuing hydrogen gas supply to the fuel cell stack. Furthermore, Japanese Patent Application Laid-open Publication No. 2004-087244 discloses a technology of exhausting residual gas in a fuel cell stack mounted on a vehicle, the technology utilizing a negative pressure which is generated by utilizing a kinetic energy when the vehicle runs.

DISCLOSURE OF INVENTION

In a fuel cell system including the hydrogen gas circulation system, if there is a deficiency such as a sealing defect in a purge valve, high-concentration hydrogen gas leaks through the purge valve to the outside of the system when the air-electrode oxygen consumption operation is performed. It is difficult to detect the sealing defect, which is caused, for example, by a foreign object caught in the sealing.

Further, during the air-electrode oxygen consumption operation, it is impossible to obtain exhaust air from the fuel cell stack, and consequently, it is impossible to reduce hydrogen concentration of the exhaust gas by diluting the exhaust gas from the exhaust valve.

The present invention has been made in the light of these problems. An object of the invention is to provide a fuel cell system which can stop, without discharging high-concentration hydrogen gas to the outside of the system, power generation of a fuel cell even in a case, for example, where there is a deficiency such as a sealing defect in a purge valve in the fuel gas circulation system.

An aspect of the present invention is a fuel cell system comprising: a fuel cell to generate electric power, being supplied with a fuel gas to a fuel electrode thereof and an oxidant gas to an oxidant electrode thereof; a fuel gas supplying device which supplies the fuel gas to the fuel electrode of the fuel cell; an oxidant gas supplying device which supplies the oxidant gas to the oxidant electrode of the fuel cell; a fuel gas pressure detector which detects fuel gas pressure at the fuel electrode of the fuel cell; a fuel gas pressure regulating device which regulates fuel gas pressure at the fuel electrode of the fuel cell; an exhaust fuel gas discharging device which discharges exhaust fuel gas from the fuel electrode of the fuel cell to the outside, the exhaust fuel gas discharging device including a purge valve; an exhaust fuel gas treatment device which treats the exhaust fuel gas discharged from the purge valve to reduce fuel gas concentration thereof; and a controller which controls power generation of the fuel cell, wherein the controller: continues power generation of the fuel cell, controlling the fuel gas pressure regulating device to lower the fuel gas pressure at the fuel electrode, having the oxidant gas supplying device continuing supplying the oxidant gas to the oxidant electrode and the purge valve closed; and after the fuel gas pressure at the fuel electrode becomes equal to or lower than the atmospheric pressure, stops power generation of the fuel cell and gas treatment of the exhaust fuel gas treatment device.

BRIEF DESCRIPTION OF THE DRAWINGS

The invention will now be described with reference to the accompanying drawings wherein.

BEST MODE FOR CARRYING OUT THE INVENTION

Figure 1:
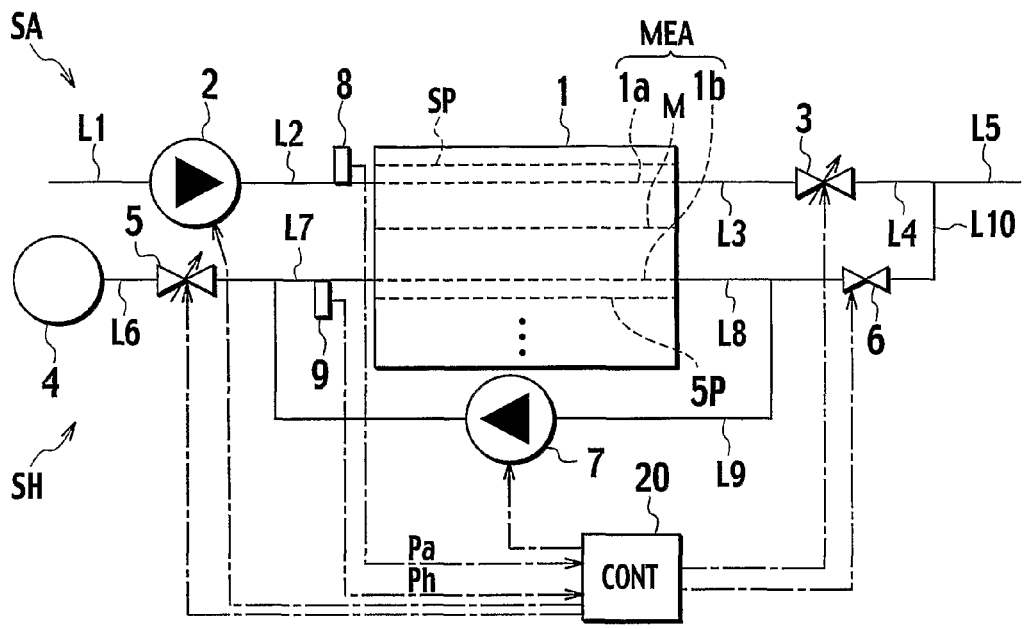
FIG. 1 is a block diagram showing a configuration of a fuel cell system of a first embodiment to which the present invention is applied.

Embodiments of the present invention will be explained below with reference to the drawings, wherein like members are designated by like reference characters.

First Embodiment

The present invention is applied to, for example, a fuel cell system configured as shown in FIG. 1.

This fuel cell system includes a fuel cell stack 1 in which a plurality of unit cells are stacked on one another. Each of the unit cells (a fuel cell) is configured with a membrane electrode assembly MEA and a pair of separators SP sandwiching the MEA. The membrane electrode assembly MEA includes an air electrode 1a (oxidant electrode), a hydrogen electrode 1b (fuel electrode), and a polymer electrolyte membrane M interposed therebetween. The fuel cell stack 1 generates electric power by an electrochemical reaction between hydrogen gas supplied as a fuel gas to the hydrogen electrodes 1b and air supplied as an oxidant gas to the air electrodes 1a.

The fuel cell system includes an air system SA and a hydrogen gas system SH. The air is introduced into and discharged from the air electrodes 1a of the fuel cell stack 1 by the air system SA. The hydrogen gas is introduced into and discharged from the hydrogen electrodes 1b of the fuel cell stack 1 by the hydrogen gas system SH. The hydrogen gas system SH discharges the exhaust hydrogen gas from the hydrogen electrodes 1b to the outside when power generation is stopped or when impurities in the system SH are discharged to the outside.

In the air system SA, a compressor 2 takes external air through an air intake passage L1 into the system SA, and air discharged from the compressor 2 is introduced through an supply air passage L2 into the air electrodes 1a of the fuel cell stack 1. An exhaust air passage L3 is connected to an outlet of the air electrodes 1a. Exhaust air discharged from the air electrodes 1a is released to the atmosphere through an air pressure regulating valve 3 and passages connected thereto including an exhaust air passage L3, another exhaust air passage L4 and a diluted exhaust gas discharge passage L5.

In the air system SA, when the fuel cell stack 1 generates electric power, a controller 20 controls a number of rotations of the compressor 2, to thereby adjust a flow rate of air introduced into the air electrodes 1a. An air pressure sensor 8 is provided to detect an air pressure Pa at an air inlet of the fuel cell stack 1, and the controller 20 adjusts an opening of the air pressure regulating valve 3 to regulate an air pressure at the air electrodes 1a. Further, the controller 20 adjusts the opening of the air pressure regulating valve 3 so as to adjust a flow rate of exhaust air flown into the exhaust air passage L4 and a diluted exhaust gas discharge passage L5 from the exhaust air passage L3.

In the hydrogen gas system SH, hydrogen gas stored in a hydrogen tank 4 at high-pressure is introduced into the hydrogen gas inlet of the hydrogen electrodes 1b through a high-pressure supply hydrogen gas passage L6 connected to the hydrogen tank 4, through a hydrogen gas pressure regulating valve 5 as a variable metering valve connected to the supply hydrogen gas passage L6, and through a low-pressure supply hydrogen gas passage L7 connected to the hydrogen gas pressure regulating valve 5. An exhaust hydrogen gas passage L8 is connected to the hydrogen-gas outlet of the hydrogen electrodes 1b. A hydrogen gas circulation passage L9 is connected to the exhaust hydrogen gas passage L8 and to the supply hydrogen gas passage L7, and has a circulation pump 7 thereon. A purge valve 6 is provided at a point where the hydrogen gas circulation passage L9 meets the exhaust hydrogen gas passage L8, and an exhaust hydrogen gas discharge passage L10 is connected to and extended from the purge valve 6. The exhaust air passage L4 and the diluted exhaust gas discharge passage L5 are connected to the exhaust hydrogen gas discharge passage L10.

In the hydrogen gas system SH, when the fuel cell stack 1 generates electric power, the controller 20 adjusts an opening of the hydrogen gas pressure regulating valve 5 to introduce hydrogen gas of the hydrogen tank 4 into the hydrogen electrodes 1b. The controller 20, in a normal operation, circulates the exhaust fuel gas discharged from the hydrogen electrodes 1b through the hydrogen gas discharge passage L8, the hydrogen gas circulation passage L9, and the supply hydrogen gas passage L7 into the hydrogen electrodes 1b, having the purge valve 6 kept opened and the circulation pump 7 running. Thereby, excessive hydrogen gas unused in power generation of the fuel cell stack 1 is circulated into the hydrogen electrodes 1b again, whereby efficiency of hydrogen use is enhanced.

The controller 20, when causing the fuel cell stack 1 to generate electric power, keeps the purge valve 6 closed, controls an opening of the hydrogen gas pressure regulating valve 5 to regulate fuel gas pressure at the hydrogen electrodes 1b, with reference to a hydrogen gas pressure Ph detected by a gas pressure sensor 9 provided at a hydrogen-gas inlet of the fuel cell stack 1.

In addition, the controller 20 has the purge valve 6 opened to discharge impurities in the hydrogen electrodes 1b, the exhaust hydrogen gas passage L8, and the hydrogen gas circulation passage L9, such as nitrogen which have been permeated from the air electrodes 1a thereinto. Thereby, exhaust fuel gas containing hydrogen is allowed to flow through the exhaust hydrogen gas discharge passage L10 into the diluted exhaust gas discharge passage L5, where the exhaust fuel gas is diluted by the exhaust air which flows from the air electrodes 1a through the exhaust air passage L4 into the diluted exhaust gas discharge passage L5. The exhaust gas is emitted to the outside after a hydrogen concentration thereof is thus made lower.

Furthermore, the controller 20, when power generation of the fuel cell stack 1 is stopped, performs at least one of: an operation to release the exhaust fuel gas containing hydrogen in the hydrogen electrodes 1b to the outside; and a power generation stopping process to allow oxygen in the air electrodes 1a to be consumed.

Figure 2:
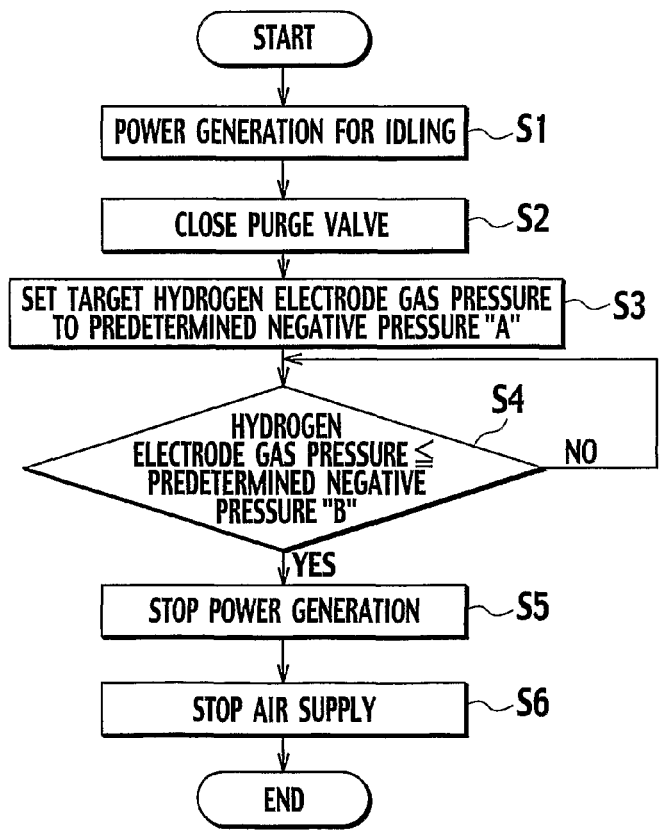
FIG. 2 is a flowchart showing a procedure of a power generation stopping process of the fuel cell system of the first embodiment to which the present invention is applied.

Next, based on the flowchart of FIG. 2, a description will be given of the power generation stopping process whereby power generation of the fuel cell stack 1 is stopped by the fuel cell system configured as described above.

In this power generation stopping process, when a power generation stop command is fed to the controller 20, first, in Step S1, the fuel cell stack 1 is allowed to generate electric power for idling load. At this time, while operating the compressor 2 at a level where the air can be introduced into the fuel cell stack 1 in an amount sufficient to flow into the diluted exhaust gas discharge passage L5 and the fuel cell stack 1 can generate low-level electric power, the controller 20 establishes a state where exhaust air discharged from the air pressure regulating valve 3 is flown into the exhaust air passage L4 and the diluted exhaust gas discharge passage L5. Additionally, the controller 20 may, by establishing a state where a load resistance (not shown) for the stop time is conducted to the fuel cell stack 1, allow the load resistance to consume the electric power generated by the fuel cell stack 1, or may establish a state where a battery is connected to the fuel cell stack 1.

Then, in Step S2, the controller 20 sets the purge valve 6 closed.

Then, in Step S3, the controller 20 sets a target gas pressure at the hydrogen electrodes 1b to a first predetermined negative pressure A, and in Step S4, judges whether the hydrogen gas pressure Ph detected by the gas pressure sensor 9, i.e. the gas pressure at the hydrogen electrodes 1b, has become equal to or lower than a second predetermined negative pressure B. By setting the target gas pressure at the hydrogen electrodes 1b at the first predetermined negative pressure A, the hydrogen gas pressure regulating valve 5 is set closed so as to stop supplying hydrogen gas from the hydrogen tank 4 to the hydrogen electrodes 1b. At this time, the hydrogen gas system SH is tightly closed from the hydrogen gas pressure regulating valve 5 to the purge valve 6, and power generation of the fuel cell stack 1 is continued with air supplied from the compressor 2 to the air electrodes 1a. Then, hydrogen in the hydrogen electrodes 1b is gradually consumed, and the gas pressure at the hydrogen electrodes 1b is lowered to a negative pressure. Thus, an operation of setting the target gas pressure at the hydrogen electrodes 1b at the first predetermined negative pressure A is: to reduce the hydrogen gas pressure at the hydrogen electrodes 1b to the first predetermined negative pressure A by allowing hydrogen in the system to be consumed in a way of continuing power generation with a part of the hydrogen gas system SH isolated from the other part thereof by setting the hydrogen gas pressure regulating valve 5 closed or narrowing the opening thereof while setting the purse valve 6 closed; and then to maintain the gas pressure at the hydrogen electrodes 1b to be the first predetermined negative pressure A by appropriately regulating the opening of the hydrogen gas pressure regulating valve 5.

In a state where the gas pressure at the hydrogen electrodes 1b has not yet reached the second predetermined negative pressure B, the controller 20 allows the power generation to be continued with the target gas pressure being set at the first predetermined negative pressure A. In a state where the gas pressure at the hydrogen electrodes 1b has reached the second predetermined negative pressure B, the process goes to Step S5.

Here, the second predetermined negative pressure B is set higher than the first predetermined negative pressure A. For example, the first predetermined negative pressure A is set at −10 kPa and the second predetermined negative pressure B at −5 kPa which is lower than the atmospheric pressure. The reason for setting the target gas pressure at the first predetermined negative pressure A instead of the second predetermined negative pressure B in Step S3 is to ensure that the hydrogen gas pressure regulating valve 5 is kept closed in order that power generation can be continued until the gas pressure reaches the second predetermined negative pressure B with which, as described below, a pressure at the purge valve 6 on a side of the fuel cell stack 1 is certainly lower than that on a side of the exhaust hydrogen gas discharge passage L10.

Then, the controller 20 stops power generation of the fuel cell stack 1 in Step S5, and stops an operation of the compressor 2 so as to stop an air supply in Step S6.

By performing the power generation stopping process, even in a state where a small leak occurs in the purge valve 6 due to a sealing defect and hydrogen gas flows into the exhaust hydrogen gas discharge passage L10 although the purge valve 6 is closed, the exhaust air is allowed to flow into the exhaust air passage L4 and into the diluted exhaust gas discharge passage L5, whereby the hydrogen gas is consumed in the fuel cell stack 1.

In a state where the gas pressure at the hydrogen electrodes 1b has been reached the second predetermined gas pressure B, the gas pressure at an upstream side (side facing the fuel cell stack 1) of the purge valve 6 is certainly lower than that of the exhaust hydrogen gas discharge passage L10, whereby hydrogen gas flow from the hydrogen electrodes 1b into the purge valve 6 is eliminated. Then, in this state, even when the air supply is stopped and a treatment of reducing a hydrogen concentration with the exhaust air is stopped, it is ensured that a gas with a high hydrogen concentration is prevented from being released to the outside.

Second Embodiment

Next, a description will be given of a fuel cell system according to a second embodiment. Note that, with respect to the same parts as those of the first embodiment, detailed descriptions are omitted, giving the same reference numerals and characters thereto.

The fuel cell system according to the second embodiment is characterized in that an operation is added of consuming oxygen of the air electrodes 1a at the time of stopping power generation of the fuel cell stack 1.

Figure 3:
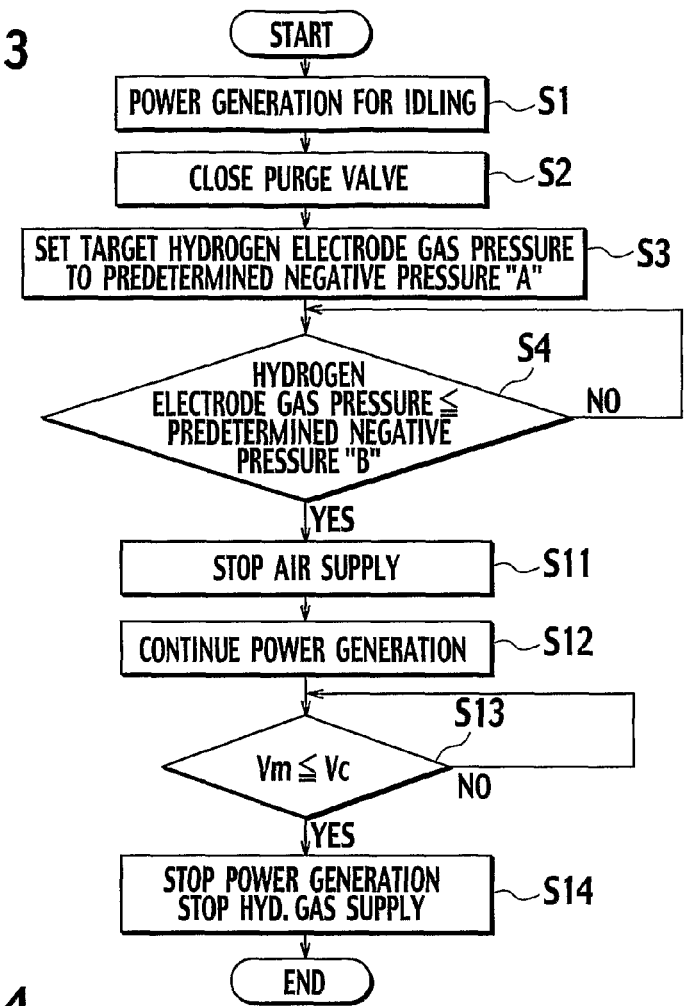
FIG. 3 is a flowchart showing a procedure of a power generation stopping process of the fuel cell system of a second embodiment to which the present invention is applied.

In the power generation stopping process in the second embodiment, as shown in FIG. 3, after it is judged that the gas pressure at the hydrogen electrodes 1b has become the second predetermined negative pressure B or lower in Step S4, the operation of the compressor 2 is stopped in Step S11 in order that the air supply to the fuel cell stack 1 can be stopped. Then in Step S12, the opening of the hydrogen gas pressure regulating valve 5 is adjusted so as to supply hydrogen, which is equivalent in amount to that to be consumed in power generation of the fuel cell stack 1, to the hydrogen electrodes 1b so as to maintain the gas pressure at the hydrogen electrodes 1b at the second predetermined negative pressure B, and power generation of the fuel cell stack 1 is continued.

Thus, residual oxygen in the air electrodes 1a is consumed by power generation of the fuel cell stack 1. Then, the controller 20, in Step S13, monitors a detected value Vm of a voltage sensor 21 which detects a generated voltage of the fuel cell stack 1, and judges whether or not the detected generated voltage value Vm of the fuel cell stack 1 has become equal to or lower than a predetermined value Vc which is a threshold for determining that residual gas in the air electrodes 1a is sufficiently consumed.

Then, in a state where the generated voltage of the fuel cell stack 1 has not become a predetermined value Vc or lower, the controller 20 continues power generation of the fuel cell stack 1. Alternatively, in a state where the detected generated voltage value Vm of the fuel cell stack 1 has become a predetermined value Vc or lower, in Step S14, the controller 20 sets the hydrogen gas pressure regulating valve 5 closed to stop a hydrogen gas supply from the hydrogen tank 4 to the fuel cell stack 1 while stopping power generation of the fuel cell stack 1.

In the power generation stopping process, during a period when the power generation of the fuel cell stack 1 is continued in Step S12, in order to maintain the gas pressure of the hydrogen electrodes 1b, which has been set in Step S3, at the second predetermined negative pressure B, the opening of the hydrogen gas pressure regulating valve 5 is adjusted so as to supply hydrogen equivalent in amount to that going to be consumed in power generation of the fuel cell stack 1, to the hydrogen electrodes 1b. Even in a state where the air supply has been stopped in S11 during this period, the gas pressure of the hydrogen electrodes 1b is maintained at the second predetermined negative pressure B. As a result, hydrogen gas cannot leak from the purge valve 6 into the exhaust hydrogen gas discharge passage L10, whereby it is ensured that hydrogen gas with a high hydrogen concentration is prevented from being released to the outside of the system.

Furthermore, in this power generation stopping process, by continuing power generation of the fuel cell stack 1 until the detected generated voltage value Vm of the fuel cell stack 1 reaches the predetermined value Vc, oxygen in the air electrodes 1a can be consumed. Thereby, deterioration of the polymer electrolyte membranes M of the fuel cell stack 1 due to residual oxygen is suppressed, whereby a lifetime of the fuel cell stack 1 can be prolonged.

Third Embodiment

Next, a description will be given of a fuel cell system according to a third embodiment. Note that, with respect to the same parts as those of the abovementioned embodiments, detailed descriptions are omitted, giving the same reference numerals and characters thereto.

Figure 4:
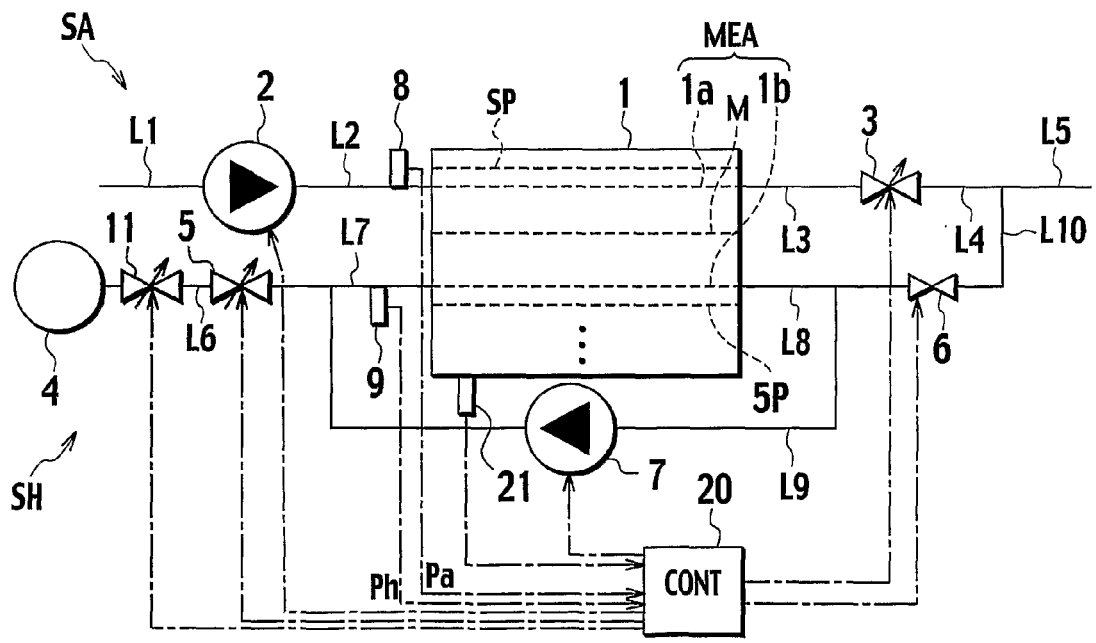
FIG. 4 is a block diagram showing a configuration of a fuel cell system of a third embodiment to which the present invention is applied.

The fuel cell system according to the third embodiment, as shown in FIG. 4, is different from the fuel cell system according to the first embodiment in that a hydrogen gas supply shutoff valve 11 is provided in the supply hydrogen gas passage L6 between the hydrogen tank 4 and the hydrogen gas pressure regulating valve 5, and is controlled by the controller 20.

In the fuel cell system, in a power generation stopping process, the hydrogen gas supply shutoff valve 11 is set closed, while the hydrogen gas pressure regulating valve 5 is set closed, so as to block hydrogen gas supply to the fuel cell stack 1 from the hydrogen tank 4 in order to bring the gas pressure at the hydrogen electrodes 1b to the first predetermined negative pressure A. Thereby, even in a state where there is a sealing defect in the hydrogen gas pressure regulating valve 5, during a period until the gas pressure at the hydrogen electrodes 1b becomes the second predetermined negative pressure B with the target gas pressure at the hydrogen electrodes 1b being set at the first predetermined negative pressure A, hydrogen gas is shut off by the hydrogen gas supply shutoff valve 11, while the hydrogen gas otherwise is likely to flow into the supply hydrogen gas passage L7 from the hydrogen tank 4 through the valve 5. Thus, it is ensured that hydrogen gas is shut off and prevented from flowing into the hydrogen electrodes 1b.

Figure 5:
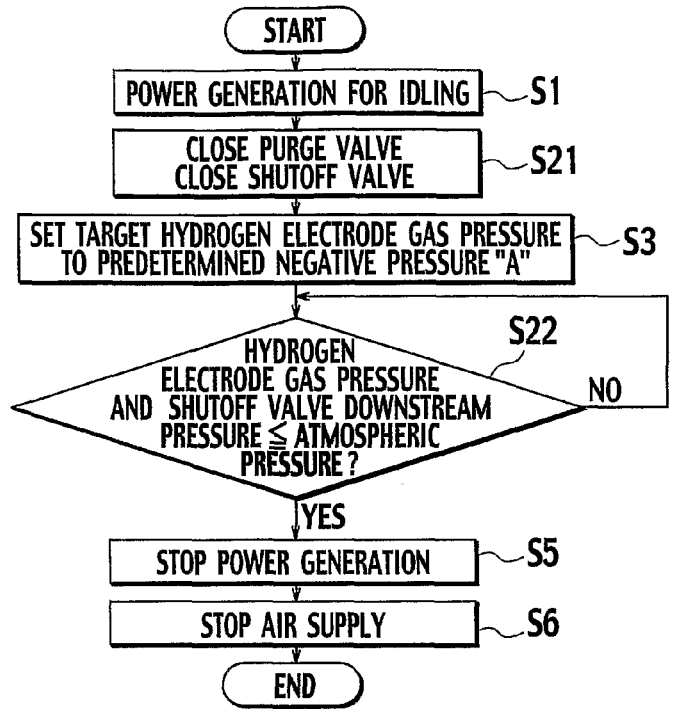
FIG. 5 is a flowchart showing a procedure of a power generation stopping process of the fuel cell system of the third embodiment to which the present invention is applied.

In the power generation stopping process, as shown in FIG. 5, in Step S21 following Step S1, the hydrogen gas supply shutoff valve 11 is set closed while the purge valve 6 is set closed, and then in Step S3, a target gas pressure of the hydrogen electrodes 1b is set to the first predetermined negative pressure A.

In Step S22 next, the controller 20 judges whether or not both a gas pressure at the hydrogen electrodes 1b and a gas pressure at a downstream side to the hydrogen gas supply shutoff valve 11 are equal to or lower than the atmospheric pressure. When at least one of them is judged to be higher than the atmospheric pressure, the controller 20 continues power generation of the fuel cell stack 1, and when they are both judged to be lower than or equal to the atmospheric pressure, the controller 20 stops the power generation in Step S5 and stops air supply in Step S6.

Here, for judging that the gas pressure at the hydrogen electrodes 1b has become equal to or lower than the atmospheric pressure, judgment can be made on the basis of a condition that the gas pressure is equal to or lower than a second predetermined negative pressure B, as in the case with the first embodiment. Additionally, for judging that the gas pressure at the downstream side of the hydrogen gas supply shutoff valve 11 is equal to or lower than the atmospheric pressure, judgment can be made by providing a sensor which directly detects a gas pressure at the downstream side of the hydrogen gas supply shutoff valve 11, and by a different procedure in which a gas pressure at the hydrogen electrodes 1b at the time when a gas pressure at the downstream side of the hydrogen gas supply shutoff valve 11 becomes equal to or lower than the atmospheric pressure is experimentally obtained beforehand, and the second predetermined negative pressure B is set lower than the experimentally obtained gas pressure.

When both the gas pressure at the hydrogen electrodes 1b and the gas pressure at the downstream side to the hydrogen gas supply shutoff valve 11 are equal to or lower than the atmospheric pressure in Step S22 as described above, a state is such that high-pressure hydrogen gas exists only at an upstream side of the hydrogen gas supply shutoff valve 11. In this state, reliability in hydrogen shutoff can be further enhanced.

Fourth Embodiment

Next, a description will given of a fuel cell system according to a fourth embodiment. Note that, with respect to the same parts as those of the abovementioned embodiments, detailed descriptions are omitted, giving the same reference numerals and characters thereto.

The fuel cell system according to the fourth embodiment is constituted of the same constituent components as those of the third embodiment which are shown in FIG. 4. However, it is different from the abovementioned embodiments in that, as shown in FIG. 6, directly after a target gas pressure at the hydrogen electrodes 1b has been set to the first predetermined negative pressure A in Step S3, an operation to consume oxygen in the air electrodes 1a is performed.

Figure 6:
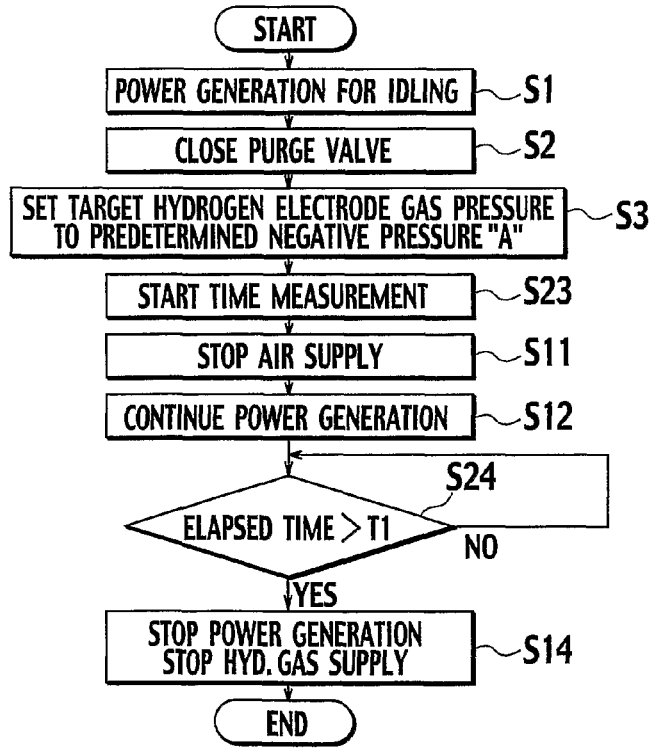
FIG. 6 is a flowchart showing a procedure of a power generation stopping process of the fuel cell system of a fourth embodiment to which the present invention is applied.

In the fuel cell system according to the fourth embodiment, the purge valve 6 is set closed in Step S2, a target gas pressure at the hydrogen electrodes 1b is set to the first predetermined negative pressure A in Step S3, and then, after the elapse of a predetermined time period T1, the hydrogen gas supply shutoff valve 11 is set closed (Steps S23 and S24) as shown in FIG. 6. Here, it is possible that the time period (predetermined time period T1) through until the time of setting the hydrogen gas supply shutoff valve 11 closed be experimentally obtained beforehand as what makes the following two timings to occur simultaneously: a timing when the detected generated voltage value Vm becomes a predetermined value Vc or lower and a timing when the gas pressure at the downstream side of the hydrogen gas supply shutoff valve 11 becomes the atmospheric pressure or lower. (Note that "simultaneously" here includes, as well as when both of the timings perfectly coincides with each other, when both of the timings substantially coincide with each other within a tolerance.)

In the fuel cell system, in Step S23 instead of Step S4 in FIG. 3, it is started measuring of an elapsed time since the target gas pressure at the hydrogen electrodes 1b has been set in Step S3 to the first predetermined negative pressure A.

Afterward, air supply to the fuel cell stack 1 is stopped and power generation of the fuel cell stack 1 is continued in Step S11 and Step S12. Then the fuel cell system, instead of Step S13 in FIG. 3, judges whether or not the elapsed time exceeds the predetermined time period T1 in Step S24. When it is judged that the elapsed time exceeds the predetermined time period T1, hydrogen gas supply to the fuel cell stack 1 is stopped by setting the hydrogen gas supply shutoff valve 11 closed, and power generation of the fuel cell stack 1 is stopped in Step S14.

After thus stopping power generation of the fuel cell stack 1, high-pressure hydrogen gas is sealed in the upstream side of the hydrogen gas supply shutoff valve 11, enhancing reliability of shutting off the high-hydrogen concentration gas during a period when the fuel cell system is being stopped. Note that, in a case where a capacity of the system, for example piping volume, between the hydrogen gas supply shutoff valve 11 and the hydrogen gas pressure regulating valve 5 is large, a pressure increase is seen in some occasions at the downstream side of the hydrogen gas supply shutoff valve 11 after Step S3 even with the hydrogen gas supply shutoff valve 11 being closed. This may be responded to by shifting a timing of closing the hydrogen gas supply shutoff valve 11 to an appropriate point of time earlier than Step S3.

Fifth Embodiment

Next, a description will be given of a fuel cell system according to a fifth embodiment. Note that, with respect to the same parts as those of the abovementioned embodiments, detailed descriptions are omitted, giving the same reference numerals and characters thereto.

Figure 7:
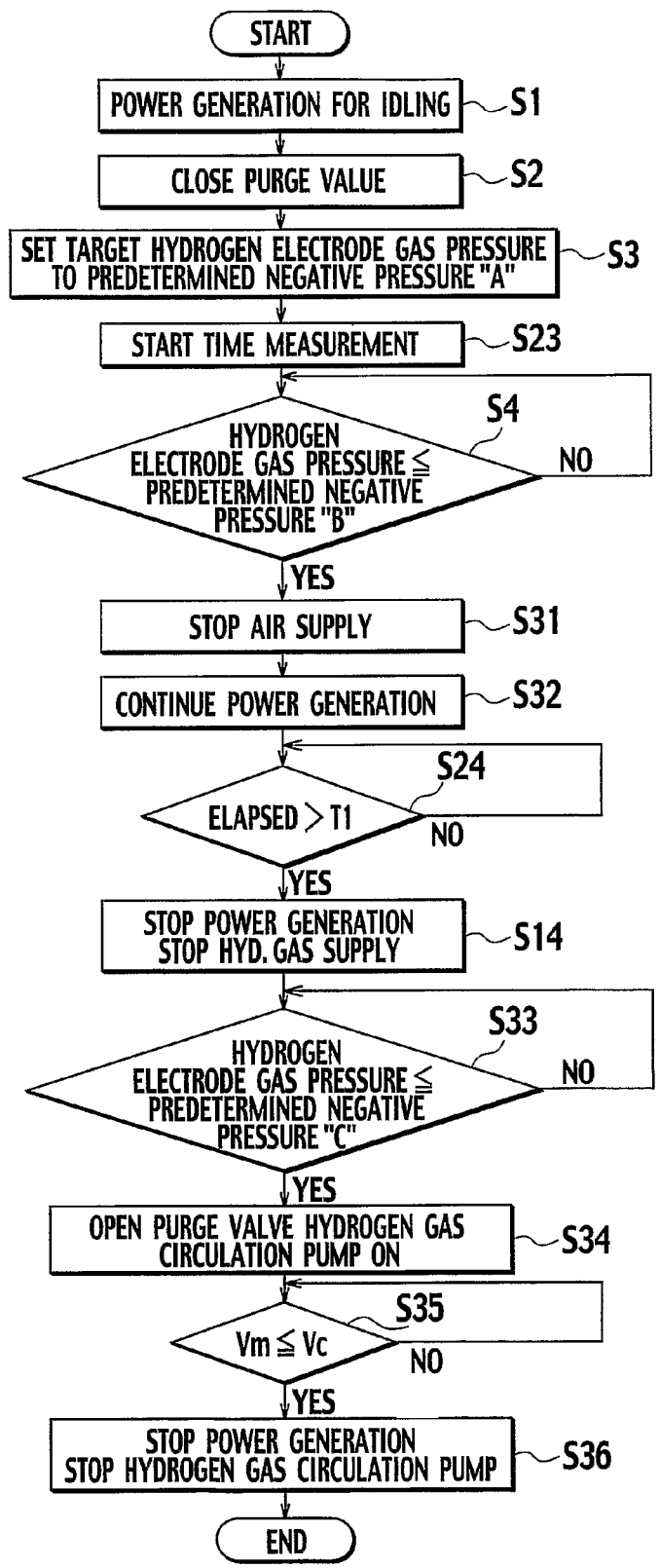
FIG. 7 is a flowchart showing a procedure of a power generation stopping process of the fuel cell system of a fifth embodiment to which the present invention is applied.

The fuel cell system according to the fifth embodiment is constituted of the same constituent components as those of the third and fourth embodiments. With regard to a control thereof, however, it is different from the abovementioned embodiments in that this fuel cell system performs a power generation stopping process as shown in FIG. 7.

This fuel cell system according to the fifth embodiment performs the abovementioned processes of Steps S1 to S4. In this system, the hydrogen gas supply shutoff valve 11 is set closed (in Steps S23, S24 and S14), when a predetermined time period T1 has elapsed since the first predetermined negative pressure A has been set in Step S3, as in the case with the fourth embodiment. The controller 20, when having judged that a gas pressure at the hydrogen electrodes 1b has become equal to or lower than the second predetermined negative pressure B in Step S4, stops air supply to the fuel cell stack 1 (in Step S31) and continues power generation of the fuel cell stack 1 (in Step S32), whereby an oxygen consumption operation of the air electrodes 1a is performed.

Before the detected generated voltage value Vm of the fuel cell stack 1 becomes a predetermined value Vc or lower (in Step S35), the controller 20 prevents a gas pressure at the downstream side of the hydrogen gas supply shutoff valve 11 from going down further to a negative pressure to endure that the hydrogen electrodes 1b are not maintained at a gas pressure lower than the first predetermined negative pressure A.

In other words, when power generation of the fuel cell stack 1 is kept continued in Step S32, the hydrogen gas supply shutoff valve 11 is being closed (in Steps S24 and S14) at the point of time when the predetermined time T1 has elapsed since the elapsed time measuring has been started in Step S23, whereby the gas pressure at the hydrogen electrodes 1b is reduced down to be equal to or lower than the first predetermined negative pressure A. In response to this, in Step S33, the controller 20 judges whether or not the gas pressure in hydrogen electrodes 1b has become equal to or lower than a third predetermined negative pressure C which is lower than that of the first predetermined negative pressure A.

Then, when having judged that the gas pressure in hydrogen electrodes 1b has become below the third predetermined negative pressure C, the controller 20 determines that a gas pressure at the downstream side of the hydrogen gas supply shutoff valve 11 has become equal to the atmospheric pressure or lower, and subsequently, drives the circulation pump 7 while opening the purge valve 6 in Step S34. Air is introduced into the hydrogen electrodes 1b in a negative pressure state, and as a result, the first predetermined negative pressure A is not maintained therein.

Here, by setting the purge valve 6 opened, damage to the electrolyte membrane M, which is caused by the decreasing gas pressure at the hydrogen electrodes 1b and the increasing difference in gas pressures at the hydrogen electrodes 1b and at the air electrodes 1a, can be prevented. Further, when the purge valve 6 is set opened, external air flows into the fuel cell stack 1 through the exhaust hydrogen gas discharge passage L10, the purge valve 6 and a gas outlet of the hydrogen electrodes 1b, because the gas pressure at the hydrogen electrodes 1b is negative. A potential difference damaging the electrolyte membrane M of the fuel cell stack 1 is prevented from occurring on the electrolyte membrane M by having the circulation pump 7 running. The circulation pump 7 pumps the external air from the exhaust hydrogen gas discharge passage L1 through the purge valve 6 to the hydrogen gas inlet of the hydrogen electrodes 1b, and introduces the external air into the hydrogen electrodes 1b. The introduced air is mixed with hydrogen gas in the hydrogen electrodes 1b, thus preventing an occurrence of a potential difference on the electrolyte membrane M.

Then, the controller 20 judges that oxygen in the air electrodes 1a has been sufficiently consumed when the detected generated voltage value Vm becomes the predetermined value Vc or lower in Step S35, and stops the circulation pump 7 while stopping power generation of the fuel cell stack 1 in Step S36.

In the abovementioned fourth embodiment, in a case where there are manufacturing variations in volumes of individual components of the hydrogen gas system SH on the downstream side of the hydrogen gas supply shutoff valve 11, and in a case where a temperature change of the fuel cell stack 1 is large, in some cases, various gas pressures occur in the hydrogen electrodes 1b after the oxygen consumption in the air electrodes 1a is over in a state where power generation of the fuel cell stack 1 is continued while air supply is stopped. In other words, if a timing of closing the hydrogen gas supply shutoff valve 11 is set at the time when the system components on the downstream side of the hydrogen gas supply shutoff valve 11 is far under a pressure equal to or lower than the atmospheric pressure, a large negative pressure occurs in the hydrogen electrodes 1b, for example in a case where the fuel cell stack 1 is used in a wide temperature range.

In the fuel cell system according to the fifth embodiment, the gas pressure at the hydrogen electrodes 1b can be prevented from being lowered to a large negative pressure in a manner that: when the gas pressure at the hydrogen electrodes 1b has become the third predetermined negative pressure C or lower, the circulation pump 7 is driven while the purge valve 6 is set opened. Therefore, it is ensured that deterioration of the fuel cell stack 1 is prevented in such cases: where a temperature range used in the fuel cell stack 1 is wide; where there are variations in volumes of individual components of the hydrogen gas system SH; and where a withstanding capability to a pressure difference is small between the air electrode 1a and the hydrogen electrode 1b on respective sides of the electrolyte membrane M.

Hereinabove, a description has been given of a case where the circulation pump 7 is driven at the same time as the purge valve 6 is set opened. However, the circulation pump 7 may be driven during the continuation of power generation with air supply being stopped, or the circulation pump 7 may be kept being driven from the very start of Step S1 to make it possible to prevent deterioration of the electrolyte membrane M of the fuel cell stack 1.

Sixth Embodiment

Next, a description will be given of a fuel cell system according to a sixth embodiment. Note that, with respect to the same parts as those of the abovementioned embodiments, detailed descriptions are omitted, giving the same reference numerals and characters thereto.

The fuel cell system according to the sixth embodiment performs an operation in response to a case where the gas pressure at the hydrogen electrodes 1b cannot decrease to the second predetermined negative pressure B because of an occurrence of a large leak through the purge valve 6 or the like.

Figure 8:
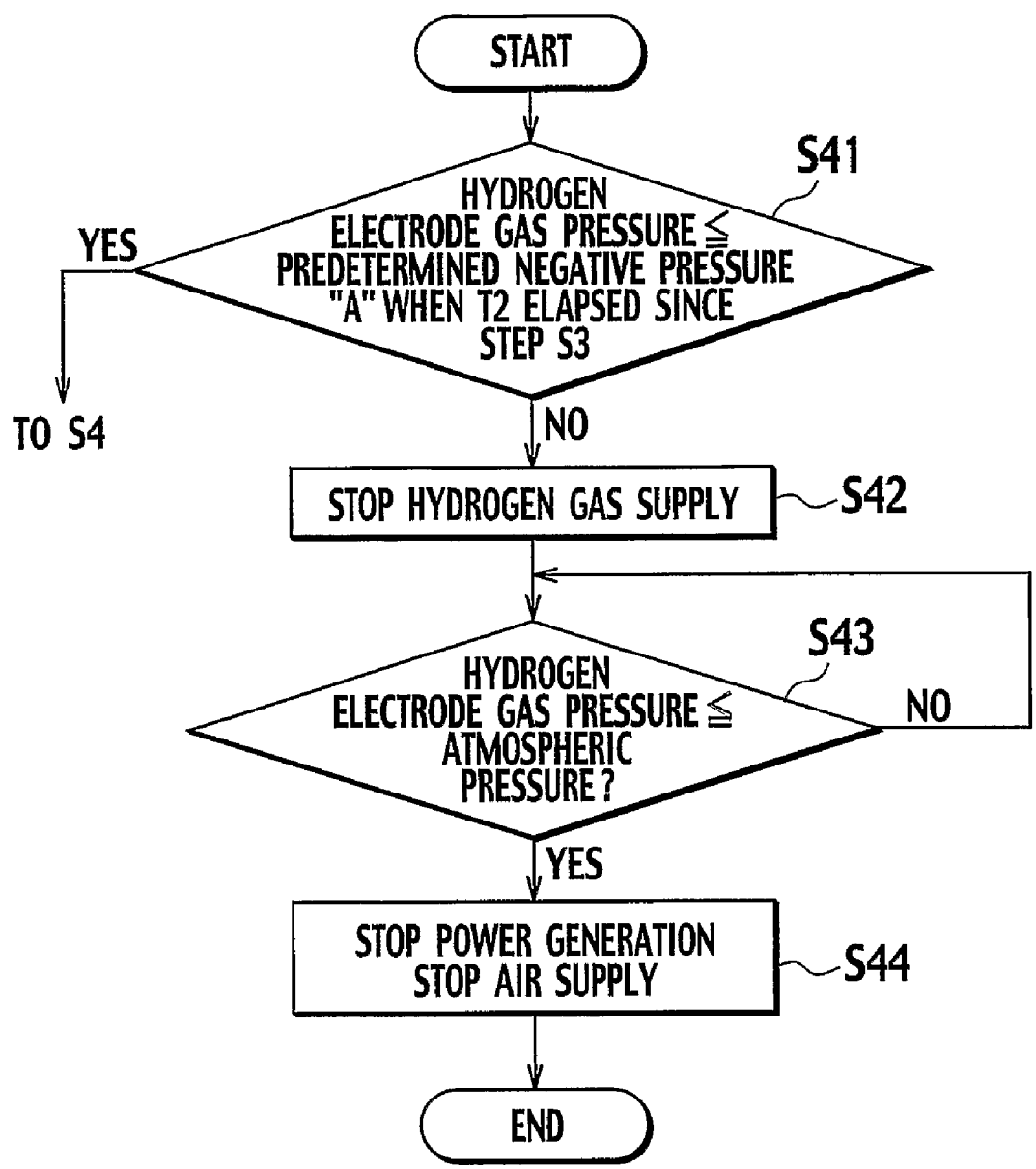
FIG. 8 is a flowchart showing a procedure of a power generation stopping process of the fuel cell system of a sixth embodiment to which the present invention is applied.

The fuel cell system according to the sixth embodiment, as shown in FIG. 8, in Step S 41 after a target gas pressure at the hydrogen electrodes 1b is set to the first predetermined negative pressure A in Step 3, when a predetermined time period T2 has elapsed since Step S3, judges whether or not a gas pressure at the hydrogen electrodes 1b has decreased to the second predetermined negative pressure B.

The predetermined time period T2 used for the judgment in Step S41 is set to a time period longer than a time period required to decrease the gas pressure at the hydrogen electrodes 1b to the second predetermined negative pressure B when the purge valve 6 is set closed in a normal state. When the purge valve 6 is set closed in a normal state, the time period required to decrease the gas pressure at the hydrogen electrodes 1b to the second predetermined negative pressure B is obtained by a calculation based on: an amount of hydrogen gas which has to be consumed to decrease the gas pressure at the hydrogen electrodes 1b to the second predetermined negative pressure B; and an amount of hydrogen gas consumed in power generation, the amount found based on a generated electric-current value of the fuel cell stack 1.

Then the controller 20, when it has judged that the gas pressure at the hydrogen electrodes 1b has been decreased to the second predetermined negative pressure B, goes to Step S4. Otherwise, when it has judged that the gas pressure at the hydrogen electrodes 1b has not yet been decreased to the second predetermined negative pressure B, the controller 20 stops hydrogen gas supply in Step S42 and judges whether or not the gas pressure at the hydrogen electrodes 1b has fallen into a predetermined pressure range near the atmospheric pressure in Step S43. Then, when having judged that gas pressure at the hydrogen electrodes 1b has fallen into a predetermined pressure range near the atmospheric pressure, the controller 20 stops power generation of the fuel cell stack 1 and air supply thereto in Step S44.

As described above, in the fuel cell system according to the sixth embodiment, even in a case where the purge valve 6 is with a large gas leak, although the oxygen consumption operation in the air electrodes 1a cannot be performed, the following is possible. The controller 20 continues power generation of the fuel cell stack 1 by continuing air supply based on the judgment in Step S41 that the gas pressure at the hydrogen electrodes 1b is no longer in a decrease in a certain time period, whereby the controller 20 can stop the power generation while securely preventing high-concentration hydrogen gas from being released to the outside.

Seventh Embodiment

Next, a description will be given of a fuel cell system according to a seventh embodiment. Note that, with respect to the same parts as those of the abovementioned embodiments, detailed descriptions are omitted, giving the same reference numerals and characters thereto.

Figure 9:
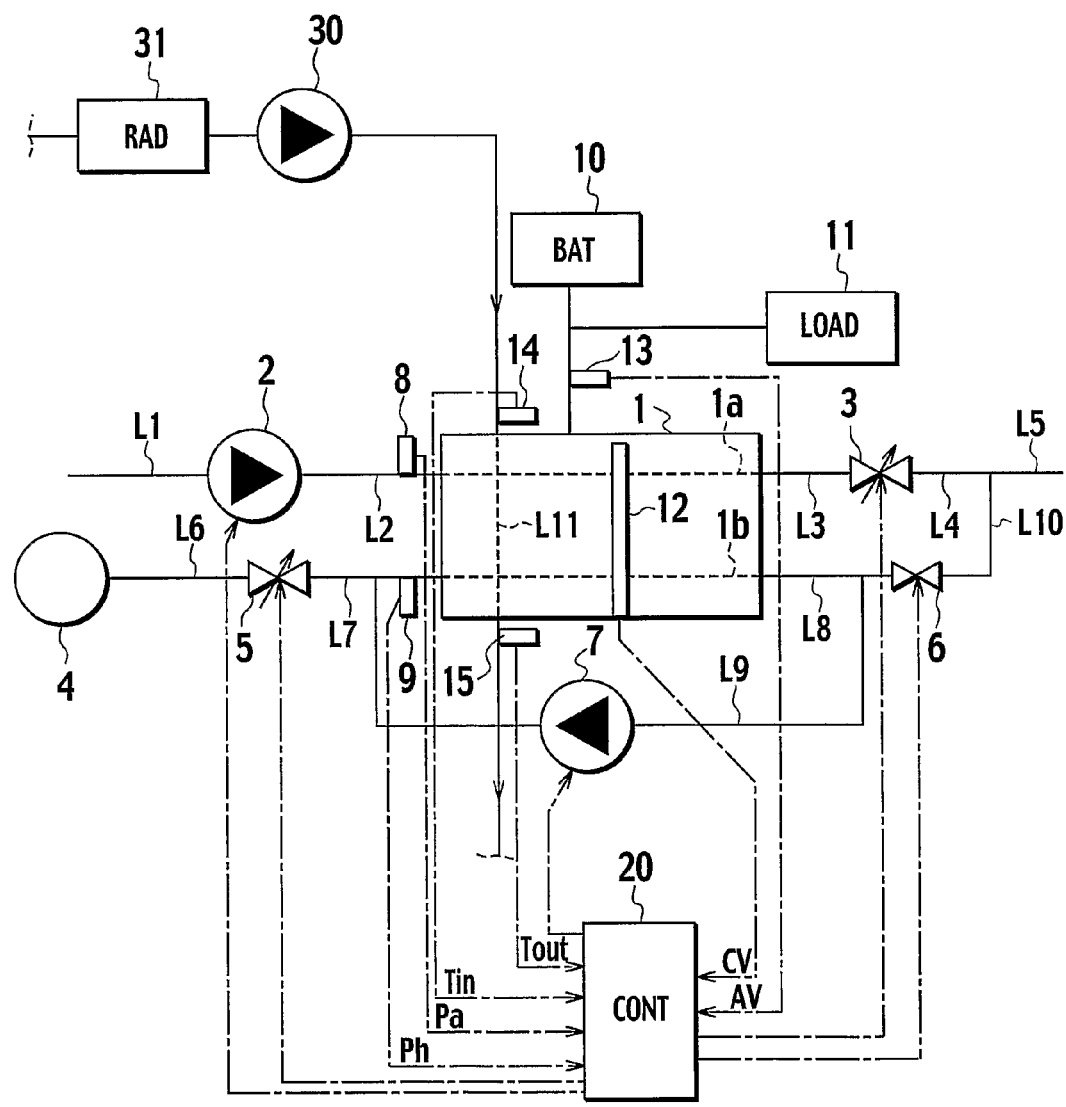
FIG. 9 is a block diagram showing a configuration of a fuel cell system of a seventh embodiment to which the present invention is applied.

The fuel cell system according to the seventh embodiment, as shown in FIG. 9, is provided with a cooling water passage (cooling passage) L11 where a cooling medium (cooling water in this embodiment) for cooling the fuel cell stack 1 is circulated. On this cooling water passage L11, a cooling-water cooling device 31 such as a radiator is provided, and cooling water in the cooling water passage L11 is cooled by this cooling-water cooling device 31. The cooled cooling water is supplied to the fuel cell stack 1 by a cooling-water pump 30 provided to the cooling water passage L11. In the fuel cell stack 1, the cooling water passage L11 is split into branches, whereby the inside of the fuel cell stack 1 can be thoroughly cooled. The cooling water warmed in the course of cooling is circulated through the cooling water passage L11 into the cooling-water cooling device 31.

A temperature detection device is provided to the cooling water passage L11, and the temperature detection device is composed of a stack-inlet cooling water temperature sensor 14 and a stack-outlet cooling water temperature sensor 15. The stack-inlet cooling water temperature sensor 14 detects a cooling water temperature at the inlet of the fuel cell stack 1 (hereinafter, referred to as a "stack-inlet cooling water temperature Tin"), and the stack-outlet cooling water temperature sensor 15 detects a cooling water temperature at the outlet of the fuel cell stack 1 (hereinafter, referred to as a "stack-outlet cooling water temperature Tout"). Detected values of these temperature sensors 14 and 15 are referred to by the controller 20 in power generation stopping process to be mentioned below.

A cell voltage sensor 12 is a sensor detecting generated voltages of respective unit cells constituting the fuel cell stack 1 (hereinafter, referred to as a "cell voltage CV"). An aggregate voltage sensor 13 is a sensor detecting a generated voltage of the entire fuel cell stack 1 (hereinafter, referred to as an "aggregate voltage AV"). A secondary battery 10 stores electric power generated by the fuel cell stack 1. A power consumption device 11 consumes electric power generated by the fuel cell stack 1. The power consumption device 11 includes auxiliary machinery used for operating the fuel cell system, a drive motor of a fuel cell vehicle, and the like.

Figure 10:
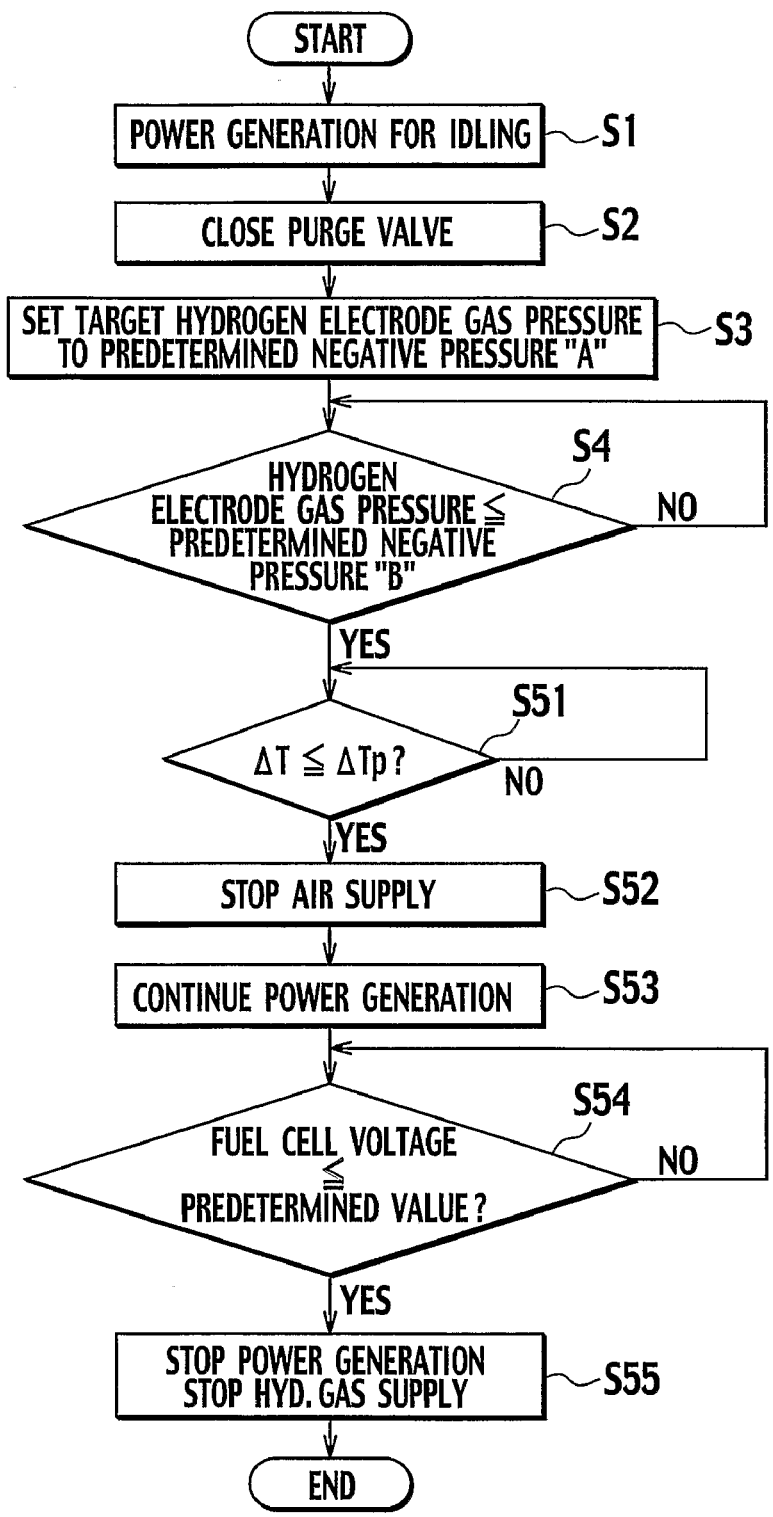
FIG. 10 is a flowchart showing a procedure of a power generation stopping process of the fuel cell system of the seventh embodiment to which the present invention is applied.

A power generation stopping process in the seventh embodiment progresses in accordance with the flowchart shown in FIG. 10. Note that an operation of the cooling-water pump 30 provided to the cooling water passage L11 has been constantly continued before the start of the power generation stopping process.

First, when a power generation stop command is fed to the controller 20, the controller 20 performs the abovementioned processes in Steps S1 to S3, and then in Step S4, judges whether the gas pressure at the hydrogen electrodes 1b has become equal to or lower than the second predetermined negative pressure B. When having judged that the gas pressure at the hydrogen electrodes 1b has not yet become equal to or lower than the second predetermined negative pressure B, the controller 20 allows the power generation to be continued while setting the target gas pressure to the first predetermined negative pressure A, and, when having judged that the gas pressure at the hydrogen electrodes 1*b* has become equal to or lower than the second predetermined negative pressure B, goes to Step S51.

In Step S51, the controller 20 judges whether or not an amount of temperature difference ΔT is not larger than a predetermined value ΔTp, the amount of the temperature difference ΔT being a difference between a stack-inlet cooling water temperature Tin detected by the stack-inlet cooling water temperature sensor 14, and a stack-outlet cooling water temperature Tout detected by the stack-outlet cooling water temperature sensor 15. When the amount of the temperature difference ΔT between temperatures respectively at the inlet and at the outlet of the fuel cell stack 1 has a value larger than the predetermined value ΔTp, that is, when there is temperature unevenness inside the fuel cell stack 1, an area susceptible to a reaction and another area unsusceptible to a reaction are generated in the air electrodes 1*a*. In this state, when the oxygen consumption operation in the air electrodes 1*a* is executed while air supply is stopped, an area where oxygen is actively consumed and another area where oxygen is hardly consumed are generated in response to such reaction unevenness in the air electrodes 1*a*. Therefore, oxygen still remains in the air electrodes 1*a* after the power generation stopping process is completed, whereby there is a possibility that deterioration of the electrolyte membrane M may further progress.

For that reason, in this embodiment, the process of this Step S51 is provided before the oxygen consumption operation is executed, where the controller 20 judges whether or not temperature unevenness has occurred inside the stack with reference to the stack-inlet cooling water temperature Tin and the stack-outlet cooling water temperature Tout. A maximum value of the amount of the cooling water temperature difference ΔT, which is large enough for the temperature unevenness not to occur inside the stack, is predetermined as a determination value (the predetermined value ΔTp) in this Step S51, through experiments and simulations.

When the amount of the temperature difference ΔT between the stack-inlet cooling water temperature Tin and the stack-outlet cooling water temperature Tout is larger than the predetermined value ΔTp, the controller 20 continues power generation until the amount of the temperature difference ΔT between the both temperatures turns into a value not larger than the predetermined value ΔTp. On the other hand, when the amount of the temperature difference ΔT between the both temperatures is not larger than the predetermined value ΔTp, the controller 20 goes to Step S52.

In Step S52, the controller 20 stops the operation of the compressor 2 so as to stop the air supply. Then in Step S53, the controller 20 continues power generation of the fuel cell stack 1. Note that, in Steps S52 and S53, the controller 20 may stop the power generation at the same time as stopping air supply to start power generation again, or may stop the air supply in a state where power generation is continued.

While the controller 20 performs, by continuing power generation while stopping air supply, an oxygen consumption operation in the air electrodes 1*a*, it judges in Step S54 whether a generated voltage of the fuel cell stack 1 has become equal to or lower than a predetermined value. Specifically, the controller 20 judges whether or not the aggregate voltage AV of the fuel cell stack 1 detected by the aggregate voltage sensor 13 has become equal to or lower than a predetermined value, and judges whether or not the lowest cell voltage CVmin among the respective cell voltages CVs detected by the cell voltage sensor 12 has become equal to or lower than another predetermined value (which is a different value from the predetermined value used as a comparative subject for the aggregate voltage AV). When a negative judgment is rendered in this Step S54, that is, when the aggregate voltage AV of the fuel cell stack 1 is higher than the predetermined value while the lowest cell voltage CVmin is higher than the different predetermined value, the oxygen consumption operation is continued. On the other hand, when a positive judgment is rendered in Step S54, that is, when the aggregate voltage AV of the fuel cell stack 1 is equal to or lower than the predetermined value or the lowest cell voltage CVmin is equal to or lower than the different predetermined value, the controller 20 judges that oxygen in the air electrodes 1*a* has been sufficiently consumed, and goes to a process in Step S55.

In Step S55, while the controller 20 stops power generation of the fuel cell stack 1, it sets the hydrogen gas regulating valve 5 closed so as to stop hydrogen gas supply to the fuel cell stack 1 from the hydrogen tank 4.

In the fuel cell system according to the seventh embodiment, the controller 20 thus stops the air supply after the amount of the temperature difference ΔT between the stack-inlet and stack-outlet temperatures of the cooling water has become a value not larger than the predetermined value. Therefore, oxygen consumption unevenness in the air electrodes 1*a* due to the temperature difference ΔTp is prevented from occurring. As a result, oxygen is prevented from remaining in the air electrodes 1*a* after the power generation stopping process is completed, whereby deterioration of the electrolyte membrane M can be prevented.

Additionally, in the fuel cell system according to this embodiment, the controller 20 stops power generation of the fuel cell stack 1 when the aggregate voltage AV of the fuel cell stack 1 has become equal to or lower than the predetermined value or when the lowest cell voltage CVmin has become equal to or lower than the different predetermined value. If the power generation were continued in a state where the aggregate voltage AV of the fuel cell stack 1 is equal to or lower than the predetermined value or where the lowest cell voltage CVmin is equal to or lower than the different predetermined value, the air electrodes 1*a* would become short of oxygen, and there would be a possibility that hydrogen might be generated thereby. However, in this embodiment, by monitoring the aggregate voltage AV of the fuel cell stack 1 and/or the lowest cell voltage CVmin, such a situation where hydrogen is generated in the air electrodes 1*a* is restrained from occurring.

Eighth Embodiment

Next, a description will be given of a fuel cell system according to an eighth embodiment. Note that, with respect to the same parts as those of the abovementioned embodiments, detailed descriptions are omitted, giving the same reference numerals and characters thereto.

Figure 11:
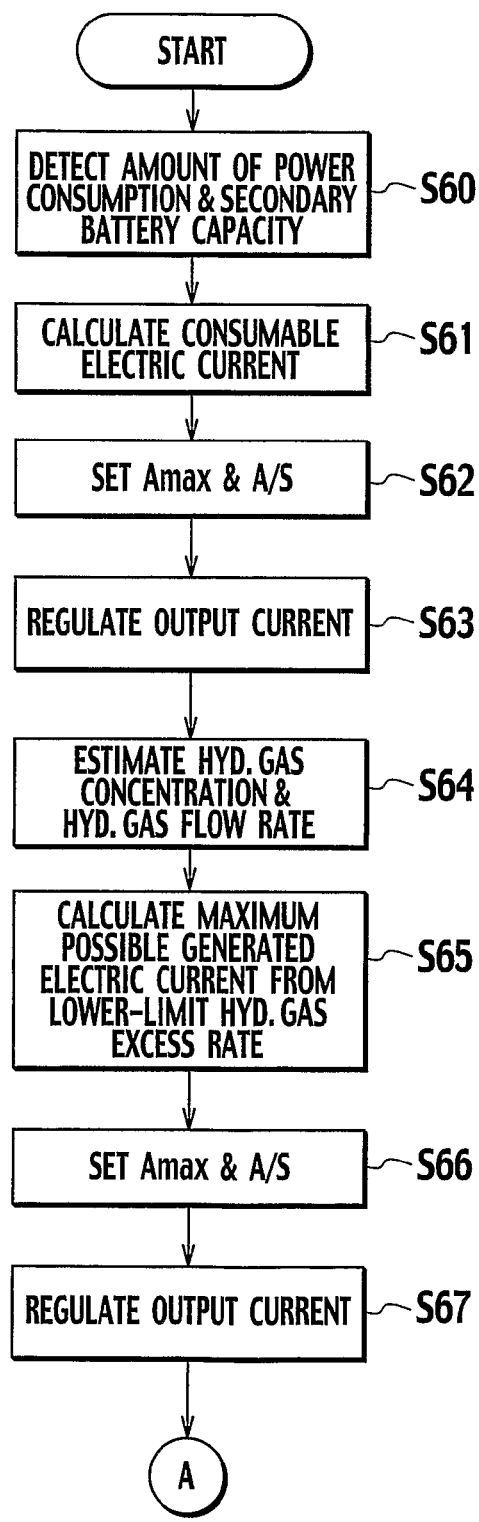
FIG. 11 is a flowchart showing a procedure of a power generation stopping process of the fuel cell system of an eighth embodiment to which the present invention is applied.
Figure 12:
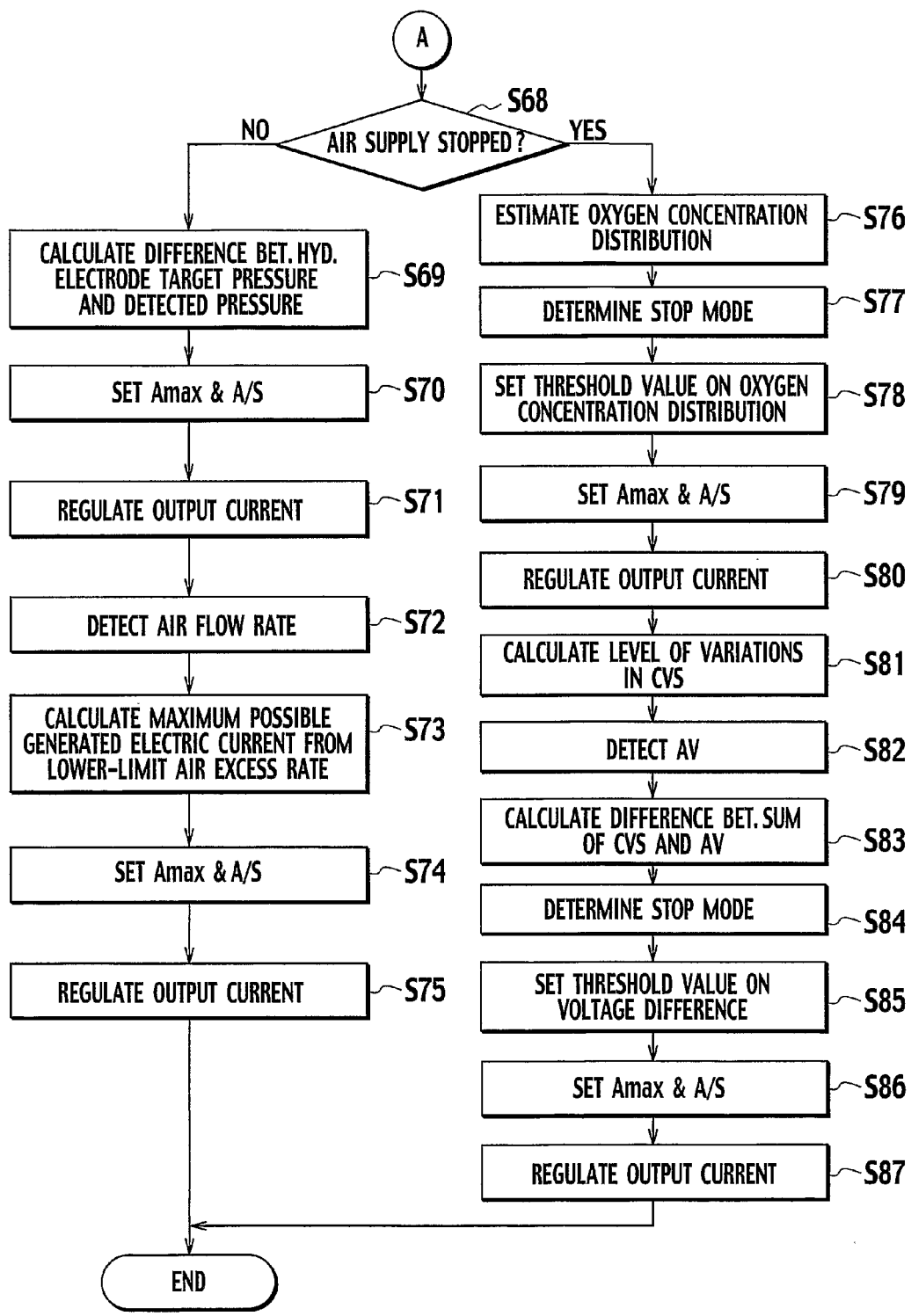
FIG. 12 is a flowchart showing a procedure of a power generation stopping process of the fuel cell system of a ninth embodiment to which the present invention is applied.

The fuel cell system according to the eighth embodiment is mainly characterized in that an output current is regulated in response to a state of the fuel cell stack 1 when the abovementioned power generation stopping process is being performed. The output current regulating process progresses in accordance with the procedure of the flowcharts shown in FIGS. 11 and 12. Note that, in this embodiment, a description will be given of the output current regulating process subject to execution of the abovementioned power generation stopping process according to the seventh embodiment.

When the power generation stop command is fed to the controller 20, first, in Step S60, the controller 20 detects an amount of power consumption used by the power consumption device 11 and also detects a capacity of the secondary battery 10, whereby the controller 20 specifies an amount of electric power chargeable to the secondary battery 10. In Step S61, based on the power consumption amount of the power consumption device 11 and on the amount of electric power chargeable to the secondary battery 10, the controller 20 calculates a maximum consumable electric current in the power consumption device 11 and the secondary battery 10 as a consumable electric current A1.

In Step S62, based on the consumable electric current A1 calculated in Step S61, the controller 20 sets: a maximum value Amax of an electric current outputted from the fuel cell stack 1 (hereinafter, referred to as a "maximum output current"); and a temporal rate of change A/S (hereinafter, referred to as a "maximum output current change rate") of an electric current outputted from the fuel cell stack 1 over a time period when the electric current is changed into the maximum output current Amax. Specifically, the controller 20 sets the consumable electric current A1 calculated in Step S61 as the maximum output current Amax. On the other hand, in a case where electric current is supplied to the secondary battery 10, since there is no need to provide a particular restriction on the maximum output current change rate A/S, the controller 20 sets the rate A/S to a predetermined maximum value (1000 A/sec, for example).

In Step S63, based on a target value (hereinafter referred to as a "target electric-current value") Atg of the output current from the fuel cell stack 1, the controller 20 regulates the output current from the fuel cell stack 1. Specifically, the controller 20 refers to both of the maximum output current Amax and the maximum output current change rate A/S respectively set in Step S62.

The controller 20 first sets the maximum output current Amax as the target electric-current value Atg, and then, at the maximum output current change rate A/S set in Step S62, regulates a target current value of one control cycle before into the target electric-current value Atg.

In Step S64, the controller 20 estimates a concentration of hydrogen gas (hereinafter, referred to as a "hydrogen gas concentration"), and estimates a flow rate of hydrogen gas (hereinafter, referred to as a "hydrogen gas flow rate") flowing through the hydrogen electrodes 1*b*. The hydrogen gas concentration is unambiguously estimated based on: a duration of power generation of the fuel cell stack 1; an elapsed time since power generation of the fuel cell stack 1 is stopped; a purge flow rate calculated based on a gas pressure at the hydrogen electrodes 1*b* and a diameter of the purge valve 6; an operational temperature of the fuel cell stack 1; and the like. On the other hand, the flow rate of hydrogen gas flowing through the hydrogen electrodes 1*b* is unambiguously calculated based on: the estimated hydrogen gas concentration; an operational state of the circulation pump 7; the operational temperature of the fuel cell stack 1; and the like.

For estimating the hydrogen gas concentration, characteristic of the hydrogen electrode 1*b* are taken into consideration. The characteristic thereof is specifically that the hydrogen gas concentration of the hydrogen electrode 1*b* tends to decrease with increase in elapsed time since the timing of power generation stop of the fuel cell stack 1. This is because hydrogen in the hydrogen electrodes 1*b* permeates from the hydrogen electrodes 1*b* into the air electrodes 1*a* and also because the hydrogen is consumed in a chemical reaction with oxygen having permeated into the hydrogen electrodes 1*b* from the air electrodes 1*a*.

Incidentally, oxygen having permeated into the hydrogen electrodes 1*b* from the air electrodes 1*a* is consumed in a chemical reaction with hydrogen, and therefore, an oxygen amount does not increase until a hydrogen amount (or the hydrogen concentration) of the hydrogen electrodes 1*b* decreases to a level at which there is no possibility that a chemical reaction occurs. After the hydrogen amount has decreased to this level, oxygen in the hydrogen electrodes 1*b* then tends to increase with increasing elapsed time, due to the oxygen permeation. Additionally, nitrogen in the hydrogen electrodes 1*b* tends to increase along with increasing elapsed time, due to the nitrogen permeation to the hydrogen electrodes 1*b* from the air electrodes 1*a*. Furthermore, water vapor tends to decrease with increasing time period because a temperature of the hydrogen electrodes 1*b* decreases with increasing elapsed time.

On the other hand, upon start-up of the fuel cell system, hydrogen gas is fed to the hydrogen electrodes 1*b*, whereby the hydrogen electrodes 1*b* are pressurized at a pressure larger than the atmospheric pressure. If the purge valve 6 is set opened with the hydrogen electrodes 1*b* being in this pressurized state, nitrogen as well as hydrogen gas is discharged from the diluted exhaust gas discharge passage L5 through the exhaust hydrogen gas discharge passage L10. However, even during the power generation, nitrogen in the hydrogen electrodes 1*b* tends to increase because of nitrogen permeation from the air electrodes 1*a* to the hydrogen electrodes 1*b*. Additionally, an amount of water vapor can be calculated based on an operational temperature of the fuel cell stack 1, whereby a hydrogen gas concentration during the power generation can be estimated furthermore based on the purge flow rate and a nitrogen permeation amount.

In Step S65, the controller 20 calculates a maximum possible generated electric current A2 and an electric-current change rate A2/S corresponding thereto, based on the hydrogen gas concentration and the hydrogen gas flow rate which have been estimated in Step S64, and on a gas pressure at the hydrogen electrode 1*b*. The maximum possible generated electric current A2 is a maximum of the generated electric current allowing hydrogen gas in the hydrogen electrode 1*b* to maintain a predetermined excess rate (a lower-limit hydrogen gas excess rate). In this calculation based on the lower-limit hydrogen gas excess rate, a distribution performance is also taken into consideration, the distribution, performance indicating how evenly hydrogen gas having flown into the hydrogen electrodes 1*b* is distributed in the hydrogen electrodes 1*b*. For example, when a total flow of hydrogen gas is entirely evenly distributed in the hydrogen electrodes 1*b*, the maximum possible generated electric current A2 and the electric-current change rate A2/S are calculated based on such an excess rate calculated by using the total flow of hydrogen gas. On the other hand, when such a situation where hydrogen gas is hard to flow is occurring in some of the individual cells constituting the fuel cell stack 1, the maximum possible generated electric current A2, which allows hydrogen gas in such some cells to maintain the predetermined excess rate, and the electric-current change rate A2/S are calculated. When this calculation in Step S65 is performed, a distribution performance of hydrogen gas has been found beforehand through experiments and simulations. Similarly, by changing the maximum possible generated electric current A2 and the electric-current change rate A2/S in various values, a relation has been found beforehand between the respective values A2 and A2/S which both correspond to the predetermined hydrogen gas excess rate.

In Step S66, the controller 20 sets the maximum output current Amax and the maximum output current change rate A/S based on the maximum possible generated electric current A2 and the electric-current change rate A2/S which have been calculated in Step S65. Specifically, the controller 20 compares the maximum output current Amax set in Step S62 and the maximum possible generated electric current A2 calculated in Step S65, and then sets the smaller of these compared values as the maximum output current Amax. Similarly, the controller 20 compares the maximum output current change rate A/S set in Step S62 and the electric-current change rate A2/S calculated in Step S65, and then sets the smaller of these compared values as the maximum output current change rate A/S.

In Step S67, based on the target electric-current value Atg, the controller 20 regulates output current from the fuel cell stack 1. Specifically, the controller 20 refers to both of the maximum output current Amax and the maximum output current change rate A/S respectively set in Step S66. The controller 20 first sets the maximum output current Amax as a present value of the target electric-current value Atg, and then, at the maximum output current change rate A/S set in Step S66, regulates a target electric-current value of one control cycle before into the target electric-current value Atg.

In Step S68, the controller 20 judges whether or not air supply has been already stopped. As shown in the abovementioned seventh embodiment, when the power generation stopping process has not yet reached the process of Step S52 or later shown in FIG. 10, air supply has not been stopped and therefore a negative judgment is rendered in this Step S68, which is then followed by processes in Steps S69 to S75. On the other hand, when the power generation stopping process has progressed to the process of Step S52 or later shown, air supply has been stopped and therefore a positive judgment is rendered in Step S68, which is then followed by processes in Steps S76 to S87.

In Step S69 following the negative judgment in Step S68, the controller 20 calculates a difference between a target gas pressure of the hydrogen electrode 1b (hereinafter, referred to as a "hydrogen electrode target gas pressure," which is a predetermined negative pressure A) and a hydrogen gas pressure Ph detected by the gas pressure sensor 9. The hydrogen gas pressure Ph is in other words an actual hydrogen gas pressure Ph in the hydrogen electrode 1b (hereinafter, referred to as "hydrogen electrode actual gas pressure Ph").

In Step S70, based on the difference between the gas pressures calculated in Step S69, the controller 20 sets the maximum output current Amax and the maximum output current change rate A/S. Specifically, when the hydrogen electrode actual gas pressure Ph is smaller than the hydrogen electrode target gas pressure, the controller 20 calculates, as a candidate for the maximum output current Amax, a value found by subtracting a predetermined amount from the ongoing output current. This candidate for the maximum output current Amax is compared with the maximum output current Amax set in Step S66, and the smaller of these compared values is set as the maximum output current Amax.

On the contrary, when the hydrogen electrode actual gas pressure Ph is larger than the hydrogen electrode target gas pressure, the controller 20 sets, as the maximum output current Amax, a value found by adding a predetermined amount from the ongoing output current. However, if the thus set value exceeds the maximum output current Amax of foregoing Step S66, the value is limited. Specifically, the controller 20 sets the maximum output current Amax up to a ceiling of the maximum output current Amax of Step S66.

Note that an increase or decrease of the maximum output current Amax depending on the difference between the gas pressures may be performed within a range between predetermined specified values, or may be performed within a range between variable values depending on a level of the difference between the gas pressures. On the other hand, in setting the maximum output current change rate A/S, the controller 20 continues using the maximum output current change rate A/S of foregoing Step S66.

In Step S71, based on the target electric-current value Atg, the controller 20 regulates output current from the fuel cell stack 1. Specifically, the controller 20 refers to both of the maximum output current Amax and the maximum output current change rate A/S respectively set in Step S70. The controller 20 first sets the maximum output current Amax as a present value of the target electric-current value Atg, and then, at the maximum output current change rate A/S set in Step S70, regulates a target electric-current value of one control cycle before into the target electric-current value Atg.

In Step S72, the controller 20 detects a flow rate (hereinafter, referred to as an "air flow rate") of air supplied to the air electrode 1a. In Step S73, the controller 20 calculates a maximum possible generated electric current A3 and an electric-current change rate A3/S corresponding thereto, based on: the air flow rate detected in Step S72; and other various values (a humidity of the air, a temperature of the air, the atmospheric pressure, and the like). The maximum possible generated electric current A3 is a maximum of the generated electric current allowing air in the air electrodes 1a to maintain a predetermined excess rate (a lower-limit air excess rate). In this calculation based on the lower-limit air excess rate, a distribution performance is also taken into consideration, the distribution performance indicating how evenly air having flown into the air electrodes 1a is distributed therein. For example, when a total flow of air is entirely evenly distributed in the air electrodes 1a, the maximum possible generated electric current A3 and the corresponding electric-current change rate A3/S are calculated based on such an excess rate calculated by using the total flow of air. On the other hand, when such a situation where air is hard to flow is occurring in some of plurality of cells constituting the fuel cell stack 1, the maximum possible generated electric current A3, which allows air in such some cells to maintain the predetermined excess rate, and the corresponding electric-current change rate A3/S are calculated. When this calculation in Step S73 is performed, the distribution performance of air has been found beforehand through experiments and simulations. Similarly, by changing the maximum possible generated electric current A3 and the electric-current change rate A3/S in various values, a relation has been found beforehand between the respective values A3 and A3/S which both correspond to the predetermined air excess rate.

In Step S74, the controller 20 sets the maximum output current Amax and the maximum output current change rate A/S based on the maximum possible generated electric current A3 and the electric-current change rate A3/S which have been calculated in Step S73. Specifically, the controller 20 compares the maximum output current Amax set in Step S70 and the maximum possible generated electric current A3 calculated in Step S73, and then sets the smaller of these compared values as the maximum output current Amax. Similarly, the controller 20 compares the maximum output current change rate A/S set in Step S70 and the electric-current change rate A3/S calculated in Step S73, and then sets the smaller of these compared values as the maximum output current change rate A/S.

In Step S75, based on the target electric-current value Atg, the controller 20 regulates output current from the fuel cell stack 1. Specifically, the controller 20 refers to both of the maximum output current Amax and the maximum output current change rate A/S respectively set in Step S74. The controller 20 first sets the maximum output current Amax as a present value of the target electric-current value Atg, and then, at the maximum output current change rate A/S set in Step S74, regulates a target electric-current value of one control cycle before into the target electric-current value Atg.

In Step S76 following the positive judgment in Step S68, the controller 20 performs estimation of an oxygen concentration distribution indicating variation in oxygen concentration in the air electrodes 1a. As a premise for performing estimation of the oxygen concentration distribution, from an assumed situation that a distribution of oxygen concentration in the air electrodes 1a is even, a decreasing oxygen concentration due to an output current from the fuel cell stack 1 is calculated. Along with this, through experiments and simulations, oxygen concentrations have been measured at the times when the stack-inlet cooling water temperature Tin, the stack-outlet cooling water temperature Tout, and the output current are respectively changed in various ways to obtain how much the foregoing calculated values differ from the measured values. Additionally, depending on various values of the output current, how much variation the cell voltages CVs show, how much difference occurs between a total sum of the individual cell voltages CVs and the aggregate voltage AV, and how much the oxygen concentration is scattered have been measured beforehand through experiments and simulations.

The controller 20 estimates the oxygen concentration distribution based on information obtained beforehand through experiments and simulations, the stack-inlet cooling water temperature Tin, the stack-outlet cooling water temperature Tout, variation among the cell voltages CVs, a difference between a total sum of the individual cell voltages CVs and the aggregate voltage AV, and an output current. Note that, in a fuel cell system provided with an oxygen sensor in the air electrode 1a, the controller 20 may obtain an oxygen concentration distribution in the air electrodes 1a based on a detected value from this sensor.

In Step S77, the controller 20 determines a stop mode. Specifically, the controller 20 determines the power generation stopping process to correspond to a case (a temporary stop) such as an idle stop, of temporarily stopping power generation of the fuel cell stack 1 while continuing power supply to the controller 20, or to correspond to a case (a complete stop) of stopping power generation of the fuel cell stack 1 while completely discontinuing power supply to the controller 20. For example, when the power generation stopping process is started in response to turning off of an ignition key of a vehicle, the controller 20 determines the ongoing stop to be the complete stop, and when the power generation stopping process is started subject to predetermined conditions while an ignition key is not turned off, the controller 20 determines the ongoing stop to be the temporary stop.

In Step S78, in response to a determination result in Step S77, the controller 20 sets a threshold value with respect to the oxygen concentration distribution in the air electrodes 1a (i.e., an allowable range of variations in oxygen concentration in the air electrodes 1a). When variations in oxygen concentration are occurring in the air electrodes 1a, oxygen remains in part of the stack inside due to uneven oxygen consumption at the time of completing the power generation stopping process, and there is a possibility that the remaining oxygen brings about deterioration of the electrolyte membrane M of the fuel cell stack 1. This phenomenon is more noticeable in the complete stop than in the temporary stop where power generation is restarted after oxygen is supplied for a short time period. Therefore, it is preferred that a level of variations in oxygen concentration in the complete stop be smaller in comparison with that in the temporary stop. In this regard, in response to a determination result in Step S77, the controller 20 sets the threshold value thereof in order that a level of variations in oxygen concentration can be smaller in the complete stop than in the temporary stop. For example, the controller 20, in the case of the complete stop, sets the threshold value thereof to a range of 0.0 to 1.0% in terms of difference between maximum and minimum concentrations, and in the case of the temporary stop, sets the threshold value thereof to a range of 0.0 to 5.0% in terms of difference between maximum and minimum concentrations.

In Step S79, on condition that the oxygen concentration distribution estimated in Step S76 is out of the range of the threshold value set in Step S78, the controller 20 sets the maximum output current Amax and the maximum output current change rate A/S based on: a present state of the oxygen concentration distribution; and the threshold value. Specifically, since the controller 20 has already obtained a corresponding relation between the output current and the oxygen concentration distribution, the controller 20 calculates, based on this corresponding relation, the maximum output current Amax and the maximum output current change rate A/S so that the oxygen concentration distribution in the air electrodes 1a falls in the range of the threshold value thereof.

Incidentally, in this Step S79, when the oxygen concentration distribution estimated in Step S76 is in the range of the threshold value set in Step S78, or when the maximum output current Amax set in Step S66 is smaller than the maximum output current Amax calculated based on the threshold value of the oxygen concentration distribution, the controller 20 continues using both of the maximum output current Amax and the maximum output current change rate A/S respectively set in Step S66.

In Step S80, based on the target electric-current value Atg, the controller 20 regulates output current from the fuel cell stack 1. Specifically, the controller 20 refers to both of the maximum output current Amax and the maximum output current change rate A/S respectively set in Step S79. The controller 20 first sets the maximum output current Amax as a present value of the target electric-current value Atg, and then, at the maximum output current change rate A/S set in Step S79, regulates a target electric-current value of one control cycle before into the target electric-current value Atg.

In Step S81, based on the individual cell voltages CVs detected by the cell voltage sensor 12, the controller 20 calculates a level of variations in the cell voltages CVs. As the calculated level of variations in the cell voltages CVs, any value indicative of the degree of variations among the individual cell voltages CVs, such as a difference between the maximum cell voltage CVmax and the minimum cell voltage CVmin, is applicable. In Step S82 following Step S81, the controller 20 detects the aggregate voltage AV by use of the aggregate voltage sensor 13.

In Step S83, the controller 20 calculates a difference between the total sum of the individual cell voltages CVs and the aggregate voltage AV (hereinafter, referred to as an "aggregate voltage difference"). When there are no variations among the individual cell voltages CVs and the cell voltage sensor 12 has detected the cell voltages CVs accurately, there must be no mismatch between the total sum of the individual cell voltages CVs and the aggregate voltage AV. However, a mismatch between the total sum of the individual cell voltages CVs and the aggregate voltage AV occurs when a potential difference is generated between a section in one particular cell not being used for detecting the cell voltage CV and another section therein being used for detecting the cell voltage CV due to internal conditions of the fuel cell stack 1 such as concentration unevenness of hydrogen gas, temperature unevenness of the fuel cell stack 1, a change in resistance depending on a level of wetness of the membrane, and the like. For this reason, in order to detect the situation, the controller 20 calculates the aggregate voltage difference in Step S83.

In Step S84, the controller 20 determines a stop mode as it does in Step S77. In Step S85 following Step S84, in response to a determination result in Step S84, the controller 20 sets a threshold value with respect to an amount of the aggregate voltage difference calculated in Step S83 (i.e., an allowable magnitude range of the aggregate voltage difference) and another threshold value with respect to a level of variations among the individual cell voltages CVs (i.e., an allowable range of variations among the individual cell voltages CVs). In comparison with the temporary stop where power generation is restarted in a short time period, the complete stop undergoes a large effect from internal conditions of the fuel cell stack 1 on deterioration of the fuel cell stack 1. Therefore, it is preferred that the aggregate voltage difference and the variations among the individual cell voltages CVs in the complete stop be relatively small in comparison with those in the temporary stop. In this regard, in response to a determination result in Step S84, the controller 20 sets the threshold values thereof so that the aggregate voltage difference and the level of variations among the individual cell voltages CVs can be smaller in the complete stop than in the temporary stop. For example, the controller 20, in the case of the complete stop, sets the threshold value of the aggregate voltage difference to a range of 0 to 5 V, and in the case of the temporary stop, sets the threshold value thereof to a range of 0 to 10 V. Additionally, for example, the controller 20, in the case of the complete stop, sets the threshold value of the level of variations among the cell voltages CVs to a range of 0 to 50 mV, and in the case of the temporary stop, sets the threshold value thereof to a range of 0 to 100 mV.

In Step S86, on condition that the level of variations among the cell voltages CVs calculated in Step S81 is out of the range of the threshold value set in Step S85 or that the aggregate voltage difference detected in Step S82 is out of the range of the threshold value set in Step S85, the controller 20 sets the maximum output current Amax and the maximum output current change rate A/S. Specifically, since the controller 20 has already obtained a corresponding relation between the output current and the variations among the individual cell voltages CVs, the controller 20 sets the maximum output current Amax and the maximum output current change rate A/S so that the variations among the cell voltages CVs of the individual cells constituting the fuel cell stack 1 can satisfy the threshold value corresponding thereto. Similarly, since the controller 20 has already obtained a corresponding relation between the output current and the aggregate voltage difference, the controller 20 sets the maximum output current Amax and the maximum output current change rate A/S so that the aggregate voltage difference of the fuel cell stack 1 can satisfy the threshold value corresponding thereto. For example, when the level of variations among the cell voltages CVs has become out of the range of the threshold value thereof, or when the aggregate voltage difference has become out of the range of the threshold value thereof, the controller 20 sets the maximum output current Amax and the maximum output current change rate A/S whereby the output current can be reduced.

However, in this Step S86, when the level of variations among the individual cell voltages CVs and the aggregate voltage difference are both out of the ranges of the respective threshold values set for them, the controller 20 uses the smaller of the values respectively set as above for the maximum output current Amax, and the smaller of the values respectively set as above for the maximum output current change rate A/S.

Additionally, when the variations among the cell voltages CVs calculated in Step S81 is in the range of the threshold value thereof and at the same time the aggregate voltage difference detected in Step S82 is in the range of the threshold value thereof, or when the maximum output current Amax set in Step S79 is smaller than the maximum output current Amax calculated based on the above threshold values, the controller 20 continues using both of the maximum output current Amax and the maximum output current change rate A/S respectively set in Step S79.

In Step S87, based on the target electric-current value Atg, the controller 20 regulates output current from the fuel cell stack 1. Specifically, the controller 20 refers to both of the maximum output current Amax and the maximum output current change rate A/S respectively set in Step S86. The controller 20 first sets the maximum output current Amax as a present value of the target electric-current value Atg, and then, at the maximum output current change rate A/S set in Step S86, regulates a target electric-current value of one control cycle before into the target electric-current value Atg.

As described above, according to the eighth embodiment, an output current from the fuel cell stack 1 is regulated in response to a state of the fuel cell stack 1. Thereby, the fuel cell system can be promptly stopped while the below-mentioned contents are satisfied.

First, as shown in the processes in Steps S60 to S63, the controller 20 calculates the consumable electric current A1 which can be consumed by the power consumption device 11 and the secondary battery 10, and then, based on this calculated value, sets the maximum output current Amax and the maximum output current change rate A/S. Thereby, a situation where an electric current inconsumable in the power consumption device 11 and the secondary battery 10 is outputted from the fuel cell stack 1 can be restrained from occurring.

Secondly, as shown in the processes in Steps S64 to S67, in order that hydrogen gas in the hydrogen electrode 1*b* can maintain a predetermined excess rate (lower-limit hydrogen gas excess rate), the controller 20 regulates output current by setting the maximum output current Amax and the maximum output current change rate A/S. Thereby, when an electric current is outputted from the fuel cell 1, a situation where the hydrogen electrode 1*b* lacks hydrogen gas can be restrained from occurring.

Thirdly, as shown in the processes in Steps S69 to S71, the controller 20 regulates output current in response to a difference between the hydrogen electrode target gas pressure and the hydrogen electrode actual gas pressure Ph. In particular, the controller 20, when the hydrogen electrode actual gas pressure Ph is larger than the hydrogen electrode target gas pressure, increases the output current (the target electric-current value Atg) from an ongoing value thereof, and, when the hydrogen electrode actual gas pressure Ph is smaller than the hydrogen electrode target gas pressure, decreases the output current (the target electric-current value Atg) from an ongoing value thereof. Thereby, the gas pressure at the hydrogen electrodes 1*b* can be promptly reduced, and additionally the target electric-current value Atg can be reduced in a case where the gas pressure at the hydrogen electrodes 1*b* is excessively reduced. Accordingly, capability to follow the hydrogen electrode target gas pressure can be enhanced.

Fourthly, as shown in the processes in Steps S72 to S75, in order that air in the air electrode 1*a* can maintain a predetermined excess rate, the controller 20 regulates output current by setting the maximum output current Amax and the maximum output current change rate A/S. Thereby, when an electric current is outputted from the fuel cell stack 1, a situation where the air electrode 1*a* lacks air can be restrained from occurring.

Fifthly, as shown in the processes in Steps S76 to S80, in order that an oxygen concentration distribution in the air electrode 1*a*, i.e., a level of variations in oxygen concentration in the air electrode 1*a* can remain in a predetermined range, the controller 20 regulates output current by setting the maximum output current Amax and the maximum output current change rate A/S. Thereby, the output current can be regulated without generating oxygen concentration unevenness by having air in the air electrodes 1*a* evenly consumed. Accordingly, deterioration of the electrolyte membrane M due to residual air is restrained.

Sixthly, as shown in the processes in Steps S81 to S87, in order that a level of variations among the cell voltages CVs can be within a predetermined range, or that an amount of the aggregate voltage difference can be within another predetermined range, the controller 20 regulates output current by setting the maximum output current Amax and the maximum output current change rate A/S. Thereby, the output current can be regulated in response to a generated voltage (variations among the cell voltages CVs, the aggregate voltage difference, and the like) of the fuel cell stack 1. Accordingly, such a situation where fuel cell stack 1 lacks a fuel gas can be restrained from occurring.

Furthermore, the controller 20 sets the abovementioned predetermined ranges variably between a case of stopping power generation of the fuel cell stack 1 while completely discontinuing power supply to itself (a complete stop), and a case of temporarily stopping power generation of the fuel cell stack 1 while continuing power supply to itself (a temporary stop). Specifically, the controller 20 sets the predetermined ranges in the complete stop being relatively small in comparison with those in the temporary stop. Thereby, on the occasion of the temporary stop (such as an idle stop), the fuel cell stack 1 can be stopped in a short time period since these ranges are values meant to allow air concentration unevenness and variations among the cell voltages CVs within ranges causing low deterioration. Additionally, on the occasion of the complete stop, a stop with low deterioration can be possible because these ranges are values meant to cause low deterioration even if it is left uncontrolled for a long time since the stop.

Note that, when the maximum output current Amax and the maximum output current change rate A/S are set, if there are various conflicting conditions (that is, there are at least any two of the consumable electric current, the excess rate of hydrogen gas, the gas pressure difference in hydrogen electrodes 1*b*, the excess rate of air, the oxygen concentration distribution, and the unevenness in generated voltage), the smallest value among values set as the maximum output current Amax is used. Thereby, an output current can be regulated in a manner that the various conflicting conditions are respectively satisfied, and thus, the abovementioned effects can be presented in a parallel manner. Additionally, by use of the maximum output current change rate A/S, a state change of the fuel cell stack 1 due to a rapid change in electric current value can be prevented. In this embodiment, on the occasion of increasing electric current, a higher priority is given to the maximum output current change rate A/S than the maximum output current Amax, and on the occasion of decreasing electric current, a higher priority is given to the maximum output current Amax than the maximum output current change rate A/S. Needless to say, it does not change the substance of the maximum output current change rate A/S even if the rate A/S is otherwise prepared as the maximum output current change rates Aup/S and Adown/S respectively for an electric-current increasing phase and for an electric-current decreasing phase.

Additionally, although a description has been given of the output current regulating process in this embodiment subject to execution of the power generation stopping process according to the seventh embodiment, the invention is not limited to this. For example, this output current regulating process may be applicable to a method, as shown in the abovementioned first to sixth embodiments, whereby the gas pressure at the hydrogen electrodes 1*b* is set to a negative pressure in the power generation stopping process.

Thus, each of the abovementioned first to eighth embodiments is one example of the invention. For this reason, needless to say, the invention is not limited to the abovementioned embodiments, and as well as these embodiments, various alterations thereto are possible depending on a design and the like as long as the various alterations are within the scope of technological concepts according to the invention.

Specifically, although the hydrogen concentration is reduced by diluting the exhaust fuel gas from the purge valve 6 by use of exhaust air of the fuel cell stack 1 in the above-described fuel cell system, for example, a catalyst combustor may be provided to the diluted exhaust gas discharge passage L5 to put hydrogen into a combustion process in the catalyst combustor, and an air supply source may be provided independently from the exhaust air of the fuel cell stack 1 to perform a dilution or combustion process on the exhaust fuel gas.

Additionally, with respect to the abovementioned power generation stopping process of the fuel cell stack 1, needless to say, not only in the case where the fuel cell system is completely shut down by stopping the controller 20 with power supply to the controller 20 discontinued, the abovementioned power generation stopping process may be applied also in the case of an idle stop where, with power supply to the controller 20 continued, the power generation of the fuel cell stack 1 is temporarily stopped along with a reduction in generated electric current which is requested during an operation of the fuel cell system. For example, in a case where generated electric power owing to the fuel cell system is used as a power source of an automobile, when power generation thereof is temporarily stopped because of the automobile's stopping at a red light or the like, the fuel cell stack 1 may be temporarily stopped by performing the abovementioned power generation stopping process.

Furthermore, in the case of completely stopping the fuel cell system, hydrogen may be shut off by the hydrogen gas supply shutoff valve 11 as described in the abovementioned third to fifth embodiments, and in the occasion of the idle stop, hydrogen may be shut off by the hydrogen gas pressure regulating valve 5 as described in the abovementioned first and second embodiments. That is, in the occasion of the complete stop of the fuel cell system where it is stopped for a long time, the hydrogen gas supply shutoff valve 11, which highly reliable about prevention of gas leakage from the hydrogen tank 4 to the fuel cell stack 1, is used, and in the occasion of the idle stop where it is stopped for a short time, hydrogen gas flowing from the hydrogen tank 4 to the fuel cell stack 1 is shut off by the hydrogen gas pressure regulating valve 5. Accordingly, when power generation is restarted, there is no need to fill high pressure hydrogen gas in between the hydrogen gas supply shutoff valve 11 and the hydrogen gas pressure regulating valve 5, whereby responsiveness in terms of time to the restart is made faster.

The preferred embodiments described herein are illustrative and not restrictive, and the invention may be practiced or embodied in other ways without departing from the spirit or essential character thereof. The scope of the invention being indicated by the claims, and all variations which come within the meaning of claims are intended to be embraced herein.

The present disclosure relates to subject matters contained in Japanese Patent Application No. 2004-364337, filed on Dec. 16, 2004, and Japanese Patent Application No. 2005-213230, filed on Jul. 22, 2005, the disclosure of which are expressly incorporated herein by reference in their entirety.

INDUSTRIAL APPLICABILITY

In the fuel cell system according to the present invention, when stopping power generation of the fuel cell stack 1, a gas pressure at the hydrogen electrodes 1b is regulated by the hydrogen gas pressure regulating valve 5, and power generation of the fuel cell stack 1 is continued while air supply from the compressor 2 to the fuel cell stack 1 is continued with the purge valve 6 closed. Even if there is a gas leakage at the purge valve 6 due to a sealing defect or the like, a hydrogen concentration of the gas through the purge valve 6 can be reduced by using exhaust air from the fuel cell stack 1. Accordingly, the present invention is applicable to a fuel cell system.

The invention claimed is:

1. A fuel cell system comprising:
a fuel cell to generate electric power, being supplied with a fuel gas to a fuel electrode thereof and an oxidant gas to an oxidant electrode thereof;
a fuel gas supplying device which supplies the fuel gas to the fuel electrode of the fuel cell;
an oxidant gas supplying device which supplies the oxidant gas to the oxidant electrode of the fuel cell;
a fuel gas pressure detector which detects fuel gas pressure at the fuel electrode of the fuel cell;
a fuel gas pressure regulating device which regulates the fuel gas pressure at the fuel electrode of the fuel cell;
an exhaust fuel gas discharging device which discharges exhaust fuel gas from the fuel electrode of the fuel cell to the outside, the exhaust fuel gas discharging device including a purge valve;
an exhaust fuel gas treatment device which treats the exhaust fuel gas discharged from the purge valve to reduce fuel gas concentration thereof;
and a controller which controls power generation of the fuel cell,
wherein the controller is programmed to:
continue power generation of the fuel cell, control the fuel gas pressure regulating device to lower the fuel gas pressure at the fuel electrode, having the oxidant gas supplying device continue supplying the oxidant gas to the oxidant electrode, and close the purge valve; and
after the fuel gas pressure at the fuel electrode becomes equal to or lower than a predetermined negative pressure, stop power generation of the fuel cell and gas treatment of the exhaust fuel gas treatment device.

2. The fuel cell system according to claim 1,
wherein the controller is programmed to stop the exhaust fuel gas treatment device treating the exhaust fuel gas while stopping the oxidant gas supplying device supplying the oxidant gas to the oxidant electrode, after the fuel gas pressure at the fuel electrode becomes equal to or lower than the predetermined negative pressure, and
wherein the controller is programmed to stop power generation of the fuel cell while stopping the fuel gas supplying device supplying the fuel gas to the fuel electrode, after a voltage of the fuel cell has become equal to or lower than a predetermined value due to the continued power generation and fuel gas supply.

3. A fuel cell system comprising:
a fuel cell to generate electric power, being supplied with a fuel gas to a fuel electrode thereof and an oxidant gas to an oxidant electrode thereof;
a fuel gas supplying device which supplies the fuel gas to the fuel electrode of the fuel cell;
an oxidant gas supplying device which supplies the oxidant gas to the oxidant electrode of the fuel cell;
a fuel gas pressure detector which detects fuel gas pressure at the fuel electrode of the fuel cell;
a fuel gas pressure regulating device which regulates the fuel gas pressure at the fuel electrode of the fuel cell;
an exhaust fuel gas discharging device which discharges exhaust fuel gas from the fuel electrode of the fuel cell to the outside, the exhaust fuel gas discharging device including a purge valve;
an exhaust fuel gas treatment device which treats the exhaust fuel gas discharged from the purge valve to reduce fuel gas concentration thereof;
and a controller which controls power generation of the fuel cell,
wherein the controller:
continues power generation of the fuel cell, controls the fuel gas pressure regulating device to lower the fuel gas pressure at the fuel electrode, having the oxidant gas supplying device continue supplying the oxidant gas to the oxidant electrode, and closes the purge valve; and
after the fuel gas pressure at the fuel electrode becomes equal to or lower than atmospheric pressure, stops power generation of the fuel cell and gas treatment of the exhaust fuel gas treatment device,
wherein the fuel gas supplying device includes a supply source which stores the fuel gas at high-pressure, and a shutoff valve provided on a downstream side of the supply source,
wherein the fuel gas pressure regulating device comprises a variable throttle valve provided on a downstream side of the shutoff valve to regulate the fuel gas pressure at the fuel electrode of the fuel cell,
wherein, before stopping power generation of the fuel cell, the controller is further configured to continue power generation of the fuel cell, to have the fuel gas supplying device continue supplying the fuel gas to the fuel electrode while stopping the oxidant gas supplying device supplying the oxidant gas to the oxidant electrode, and close the purge valve, and
wherein the controller is configured to stop power generation of the fuel cell while stopping the fuel gas supplying device supplying the fuel gas to the fuel electrode by closing the shutoff valve so as to make substantially simultaneous a timing when a voltage of the fuel cell becomes equal to or lower than a predetermined value, and a timing when fuel gas pressure at the downstream side of the shutoff valve becomes equal to or lower than another predetermined value.

4. The fuel cell system according to claim 1, wherein the exhaust fuel gas treatment device uses exhaust oxidant gas from the oxidant electrode of the fuel cell to dilute the fuel gas concentration of the exhaust fuel gas.

5. The fuel cell system according to claim 1,
wherein the fuel gas supplying device includes a supply source which stores the fuel gas at high-pressure, and a shutoff valve provided on a downstream side of the supply source; and the fuel gas pressure regulating device comprises a variable throttle valve provided on a downstream side of the shutoff valve to regulate fuel gas pressure at the fuel electrode, and wherein the controller is programmed to: continue power generation of the fuel cell, having the shutoff valve closed; and after fuel gas pressure at the downstream side of the shutoff valve and the fuel gas pressure at the fuel electrode become equal to or lower than atmospheric pressure, stop power generation of the fuel cell and gas treatment of the exhaust fuel gas treatment device.

6. The fuel cell system according to claim 2, wherein the fuel gas supplying device includes a supply source which stores the fuel gas at high-pressure, and a shutoff valve provided on a downstream side of the supply source; and the fuel gas pressure regulating device comprises a variable throttle valve provided on a downstream side of the shutoff valve to regulate fuel gas pressure at the fuel electrode, and wherein the controller is programmed to: after the controller has stopped the oxidant gas supplying device supplying the oxidant gas to the oxidant electrode and before the voltage of the fuel cell becomes equal to or lower than the predetermined value, close the shutoff valve so as to disallow the fuel gas pressure at the fuel electrode to be maintained within a predetermined negative-pressure range equal to or lower than atmospheric pressure; and when the fuel gas pressure at the fuel electrode has become lower than the predetermined negative-pressure range, introduce an external gas into the fuel electrode by opening the purge valve.

7. The fuel cell system according to claim 6, further comprising:

a circulation device which supplies the exhaust fuel gas from the fuel electrode of the fuel cell to a fuel gas inlet of the fuel electrode, wherein the controller is programmed to, during a time after the purge valve is opened and before the power generation of the fuel cell is stopped with the voltage of the fuel cell equal to or lower than the predetermined value, operate the circulation device to introduce the external gas, which is introduced from the purge valve, into the fuel gas inlet of the fuel electrode.

8. The fuel cell system according to claim 1, wherein the controller is programmed to, in a case where the fuel gas pressure at the fuel electrode does not become equal to or lower than the predetermined negative pressure even when power generation of the fuel cell is continued with the purge valve closed, stop the fuel gas supplying device supplying the fuel gas to the fuel cell, and when the fuel gas pressure at the fuel electrode becomes within a predetermined range near the predetermined negative pressure, stop the exhaust fuel gas treatment device treating the exhaust fuel gas while stopping the oxidant gas supplying device supplying the oxidant gas to the fuel cell.

9. The fuel cell system according to claim 1, wherein the fuel gas supplying device includes a supply source which stores the fuel gas at high-pressure, and a shutoff valve provided on a downstream side of the supply source; and the fuel gas pressure regulating device comprises a variable throttle valve provided on a downstream side of the shutoff valve to regulate fuel gas pressure at the fuel electrode, and wherein, in a case where power generation of the fuel cell is completely shut down with power supply to the controller discontinued, the controller is programmed to stop the fuel gas supplying device supplying the fuel gas to the fuel gas electrode by use of the shutoff valve, and in a case where power generation of the fuel cell is temporarily stopped with power supply to the controller continued, the controller is programmed to stop the fuel gas supplying device supplying the fuel gas to the fuel gas electrode by use of the variable throttle valve.

10. The fuel cell system according to claim 2, further comprising:

a temperature detecting device which detects an inlet temperature of a cooling medium for cooling the fuel cell at a cooling medium inlet of the fuel cell and an outlet temperature of the cooling medium at a cooling medium outlet of the fuel cell, wherein the controller is programmed to stop the exhaust fuel gas treatment device treating the exhaust fuel gas while stopping the oxidant gas supplying device supplying the oxidant gas to the oxidant electrode, after an amount of temperature difference between the inlet temperature and the outlet temperature has become equal to or lower than a predetermined value.

11. The fuel cell system according to claim 2, wherein the fuel cell comprises a plurality of cells, and wherein, in one of the cases where an aggregate voltage of the respective cells of the fuel cell has become equal to or lower than a predetermined aggregate voltage value, and where a lowest voltage among the respective cells of the fuel cell has become equal to or lower than another predetermined value, the controller is programmed to stop power generation of the fuel cell while stopping the fuel gas supplying device supplying the fuel gas to the fuel electrode.

12. The fuel cell system according to claim 1, wherein the controller is programmed to regulate output current from the fuel cell depending on a state of the fuel cell.

13. The fuel cell system according to claim 12, wherein the controller is programmed to: set a maximum output current from the fuel cell, and a maximum output current change rate defining a maximum rate of change of the output current at which the output current from the fuel cell is changed to the maximum output current, depending on the state of the fuel cell;

and regulate the output current based on the set maximum output current and the maximum output current change rate.

14. The fuel cell system according to claim 12, wherein the state of the fuel cell comprises a difference between a fuel-electrode target gas pressure, which is a target value for the fuel gas pressure at the fuel electrode, and a fuel-electrode actual gas pressure, which is an actual fuel gas pressure at the fuel electrode, and wherein, depending on a difference between the fuel-electrode target gas pressure and the fuel-electrode actual gas pressure, the controller is programmed to regulate the output current.

15. The fuel cell system according to claim 14, wherein the controller is programmed to increase the output current when the fuel-electrode actual gas pressure is larger than the fuel-electrode target gas pressure, and decrease the output current, when the fuel-electrode actual gas pressure is smaller than the fuel-electrode target gas pressure.

16. The fuel cell system according to claim 12, wherein the state of the fuel cell comprises an excess rate of the oxidant gas in the oxidant electrode, and the controller is programmed to regulate the output current so that the oxidant gas can maintain a predetermined excess rate in the oxidant electrode.

17. The fuel cell system according to claim 12, wherein the state of fuel cell comprises an excess rate of the fuel gas in the fuel electrode, and the controller is programmed to regulate the output current so that the fuel gas can maintain a predetermined excess rate in the fuel electrode.

18. The fuel cell system according to claim 12, wherein the controller is programmed to, in a case of continuing power generation of the fuel cell after stopping oxidant gas supply from the oxidant gas supplying device to the fuel cell, regulate the output current from the fuel cell depending on the state of the fuel cell.

19. The fuel cell system according to claim 18,
wherein the state of the fuel cell comprises an oxygen concentration distribution which indicates a level of variations in oxygen concentration in the oxidant electrode, and
wherein the controller is programmed to regulate the output current so that the oxygen concentration distribution in the oxidant electrode can be within a predetermined range.

20. The fuel cell system according to claim 18,
wherein the fuel cell comprises a plurality of cells, and the state of the fuel cell comprises a level of variations in voltages of the respective cells of the fuel cell, and
wherein the controller is programmed to regulate the output current so that the level of variations in the voltages can be within a predetermined range.

21. The fuel cell system according to claim 20, wherein the controller is programmed to decrease the output current when the level of variations in the voltages is out of the predetermined range.

22. The fuel cell system according to claim 18,
wherein the fuel cell comprises a plurality of cells, and the state of the fuel cell comprises an amount of an aggregate voltage difference which indicates a difference between a sum total of voltages of the respective cells of the fuel cell and an aggregate voltage of the fuel cell, and
wherein the controller is programmed to regulate the output current so that the amount of the aggregate voltage difference can be within a predetermined range.

23. The fuel cell system according to claim 22, wherein the controller is programmed to decrease the output current when the amount of the aggregate voltage difference is out of the predetermined range.

24. The fuel cell system according to claim 19,
wherein the controller is programmed to variably set the predetermined range between a case of stopping power generation of the fuel cell with power supply to the controller discontinued, and a case of temporarily stopping power generation of the fuel cell with power supply to the controller continued.

25. The fuel cell system according to claim 24,
wherein the controller is programmed to, in the case of stopping power generation of the fuel cell with power supply to the controller discontinued, set the predetermined range being relatively small in comparison to that in the case of temporarily stopping power generation of the fuel cell with power supply to the controller continued.

* * * * *